Jan. 2, 1962     L. O. MESENHIMER     3,015,771

VOLTAGE MODIFIER

Filed May 29, 1958     7 Sheets-Sheet 1

INVENTOR.
LEE O. MESENHIMER.

BY John H. Smith

ATTY.

INVENTOR.
LEE O. MESENHIMER.
BY John H. Smith
ATTY.

Jan. 2, 1962 L. O. MESENHIMER 3,015,771
VOLTAGE MODIFIER

Filed May 29, 1958 7 Sheets-Sheet 3

INVENTOR.
LEE O. MESENHIMER.
BY John H. Smith
ATTY.

Jan. 2, 1962   L. O. MESENHIMER   3,015,771
VOLTAGE MODIFIER

Filed May 29, 1958   7 Sheets-Sheet 4

INVENTOR.
LEE O. MESENHIMER.
BY *John W. Smith*
ATTY.

Jan. 2, 1962   L. O. MESENHIMER   3,015,771
VOLTAGE MODIFIER
Filed May 29, 1958   7 Sheets-Sheet 5
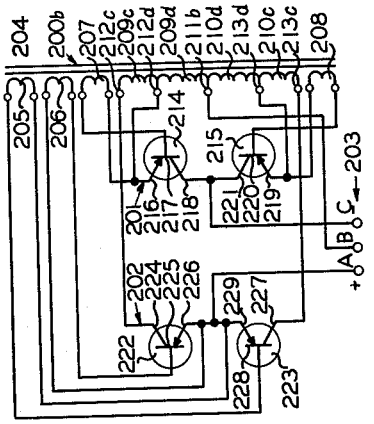
INVENTOR.
LEE O. MESENHIMER.
BY John H. Smith
ATTY.

Jan. 2, 1962   L. O. MESENHIMER   3,015,771
VOLTAGE MODIFIER

Filed May 29, 1958   7 Sheets-Sheet 7

INVENTOR.
LEE O. MESENHIMER.

BY *John H. Smith*

ATTY.

United States Patent Office 3,015,771
Patented Jan. 2, 1962

3,015,771
VOLTAGE MODIFIER
Lee Orland Mesenhimer, Lakewood, Ohio, assignor to Lorain Products Corporation, a corporation of Ohio
Filed May 29, 1958, Ser. No. 738,798
34 Claims. (Cl. 321—15)

My invention relates to an electrical system adapted to be connected between a source of unidirectional voltage and a load, and is directed more particularly to such a system for modifying the source voltage and supplying it, as so modified, to the load as unidirectional voltage.

While my invention is adaptable to a wide variety of industrial uses, one exemplary application thereof is in the communications field.

If for example, the supply of unidirectional voltage to a telephone system is forty-eight volts for the automatic part of the circuit, modifications of that voltage, particularly fractions thereof, may be required for other operations. In such event it is either necessary to supply, at considerable additional cost, a second, separate lower voltage supply together with the necessary associated components or to provide, in the event a fraction of the available supply is needed, an intermediate tap on the forty-eight volt supply.

The latter expedient is sometimes feasible, but in itself entails increased expense since, with twenty-four volt operation from the tapped forty-eight volt supply, assuming the latter for purposes of explanation to be a battery, the two sections of the source defined by the mid-tap are discharged differentially, thus requiring additional battery charging facilities to maintain the entire system properly and evenly charged.

If a forty-eight volt charging apparatus already available is used in order to avoid the expense of additional such apparatus, then either the lesser used battery section is overcharged in an endeavor to properly charge the section used for the lower voltage system, or the latter section is undercharged in an endeavor not to overcharge the lesser used portion of the battery system.

In the past it has been customary, in some cases, when a fraction of source voltage is required, to provide counter EMF cells, resistive voltage dividers or series voltage regulators for this purpose. These devices function as resistive or dissipative elements in the circuit and are thus accompanied by losses and inefficiencies which are quite costly from a commercial standpoint. Furthermore, such expedients as those mentioned above generally fail to give good voltage regulation and operate at low efficiency.

To the end that the above difficulties may be overcome and as an important object of my invention I have provided a voltage modifier, particularly a voltage fractionalizer, characterized by its ability to substantially uniformly utilize the entire D.-C. source in supplying to the load a predetermined fraction of the source voltage, the voltage fractionalizing operation being accompanied by a high order of efficiency and with improved regulation characteristics.

Additionally, I have provided a voltage fractionalizer which eliminates losses encountered in the use of counter EMF cells and the like in that the characteristics of resistance or voltage dissipation are not relied upon. Thus the voltage modifier of my invention is of much greater efficiency than those assemblies heretofore used.

More specifically it is an object of my invention to provide a voltage fractionalizer circuit for accomplishing the above which includes an inductor having an intermediate tap delimiting exciting and inducing coil sections, oscillating means for alternately and severally, functionally interchanging said coil sections about said intermediate tap and so connected to the source and load that the intermediate tap on the coil is essentially the equivalent of a source mid-tap. The intermediate tap of my circuit is at a potential in the system substantially equal in voltage magnitude to the potential midway between the poles of the source, thus affording the fractionalizing advantages of a mid-tap on the source without the attendant disadvantages thereof.

It is a further object of my invention to provide a voltage modifier capable of attaining the advantages stated herein by the use of static components, that is, having no moving parts subject to wear or deterioration during use and requiring little or no maintenance.

In the use of voltage modifiers, consideration must be given to the nature of already existing installations with which the voltage modifying device will be used as well as to the specific modifying requirements of any particular installation. In this respect both common positive and common negative source-load connections are encountered. Additionally, voltage multiplying action as well as polarity changing or incorporation into a three wire distribution system may be involved.

Accordingly, as a further object of my invention I have provided minimum voltage modifier circuitry adapted to the fractionalizing functions stated above and which is also adaptable without change to both common positive and common negative conditions.

As another object of my invention I have provided minimum voltage modifier circuitry adapted to the fractionalizing function stated above and which is also adapted, without circuit changes in the modifier itself, to voltage multiplying operations.

Another object of my invention is to provide a voltage modifier of the above character which is adapted for use, without change, as a polarity changer or which may be utilized in conjunction with a three wire distribution system thereby providing a three wire output from a two poled, unidirectional voltage source.

Still another important object of my invention is to provide a voltage modifier adapted to both receive and supply unidirectional voltage, this being accomplished with simple and minimum circuitry which attains the voltage modification by oscillatory means.

It is a further object of my invention to provide a voltage modifier having unidirectional voltage input and output and adapted to afford voltage modification between source voltage and that applied to the load in variable ratios from zero to a very high ratio limited only by the capability of the components to handle the voltage applied thereto.

Still another object of my invention is to provide a unidirectional voltage modifier having an inductor including a coil provided with exciting and inducing sections and tap arrangements whereby a wide variety of predetermined ratios between source voltage and load voltage may be obtained, said tap arrangements being arranged for field adjustment whereby the user may select the source-load voltage ratio desired.

Still another object of my invention is to provide a voltage modifier having a terminal system including positive, negative and electrically intermediate terminals, said modifier being oscillatory in nature and including a switching circuit and a control or rectifying circuit so arranged that the output terminals of the changer have applied to them modified current of like direction during each half cycle of oscillation.

It is a still further object of my invention to provide a device of the above character including means having current blocking and electro-responsive current conducting characteristics such means being shown in the present embodiment of my invention as semi-conductors.

It is a further object of my invention to provide, in a voltage modifier circuit, unidirectional current passing means for protecting the electro-responsive elements in the circuit from voltage peaks developed in the inductor and also under conditions to be fully described hereafter to divert from said electro-responsive means a major part of the load current.

It is another object of my invention to provide in a voltage modifier, circuitry whereby normal flow of current is maintained with extremely light loads approaching a no load condition.

As applied to one form of my voltage modifier shown herein, it is another object of my invention to provide such a device including switching and rectifying circuits which are functionally interchangeable to afford broad application of my invention to the wide variety of uses and conditions stated above.

As a further object of my invention the voltage modifying circuitry I have provided contemplates the novel combination of an inductor of the type functioning as an autotransformer and having exciting and inducing coil sections which are functionally interchangeable upon each half cycle of oscillation; a three poled terminal system including positive, negative and electrically intermediate terminals; a switching circuit and a control or rectifying circuit having oscillating means, all arranged in a novel manner to fulfill a wide variety of voltage modifying requirements met in the industrial and communication fields and which may be arranged to supply either substantially unidirectional voltage or unidirectional voltage having an A.-C. component of predetermined magnitude.

Many other objects and advantages of my invention will become apparent from the following description and accompanying drawings in which:

FIGS. 1, 2 and 3 are schematic diagrams showing circuits embodying my invention and arranged for common positive source and load connections to afford voltage fractionalizing action in the following ranges respectively; one half of the source voltage, fractionalizing from zero to one half the source voltage and fractionalizing from one half the source voltage to a voltage equal to that of the source.

FIGS. 4, 5 and 6 are schematic diagrams showing circuits embodying my invention and arranged for common negative source and load connections to afford voltage fractionalizing action in the following ranges respectively; one half of the source voltage, fractionalizing from zero to one half of the source voltage and fractionalizing from one half the source voltage to a voltage equal thereto.

FIGS. 7, 8 and 9 are schematic diagrams showing the circuits of FIGS. 1, 2 and 3 embodying my invention adapted for use with common negative connections between the source and the load and giving voltage multiplying action in the following ranges respectively; voltage doubling, voltage multiplying up to double the source voltage and voltage multiplying from double the source voltage to a very high multiplication thereof.

FIGS. 10, 11 and 12 are schematic diagrams showing the circuits of FIGS. 4, 5 and 6 embodying my invention and adapted for use with common positive connections between the source and the load and giving voltage multiplying action in the following ranges respectively; voltage doubling, voltage multiplication up to double the source voltage and voltage multiplication from double the source voltage up to very high multiplication thereof.

FIGS. 13, 14 and 15 show a preferred circuit, embodying my invention, and adapted to accommodate both common positive and common negative source-load connections and also to give both voltage multiplying and voltage fractionalizing action, the circuit of FIG. 13 giving halving or doubling action, that of FIG. 14 giving variable voltage ratios from zero to a very high multiplication of source voltage for given common positive and common negative source-load networks and that of FIG. 15 giving variable voltage ratios from zero to a very high multiplication of source voltage for given common positive and common negative source and load connections encountered in the field.

FIG. 16 is a schematic diagram of a common negative fractionalizing source-load network adaptable to FIGS. 13, 14 or 15.

FIG. 17 is a schematic diagram of a common positive fractionalizing source-load network adaptable to FIGS. 13, 14 or 15.

FIG. 18 is a schematic diagram of a common negative multiplying source-load network adaptable to FIGS. 13, 14 or 15 and;

FIG. 19 is a schematic diagram of a common positive multiplying source-load network adaptable to FIGS. 13, 14 or 15.

While transistor controlled, oscillatory circuits are known and have been used in the past for various purposes, my invention contemplates the use of such a circuit combined in a novel manner with an inductor, a unidirectional current controlling circuit and a novel terminal system whereby the voltage changer embodying the principles of my invention is adapted for ready and easy application to a wide variety of varying conditions such as voltage multiplying, voltage fractionalizing, both in an infinite variety of ratios, polarity changing, and with a three wire distribution system.

In addition my invention contemplates a changer circuit in which a unidirectional voltage source, through an electroresponsive switching circuit, is connected across exciting and inducing coil sections of an inductor and in which the load, through a control or rectifying circuit is connected across the inducing coil section of an inductor for voltage fractionalizing purposes, and, on the other hand, for voltage multiplying, the source is connected across the exciting section of the inductor coil and the load is connected across the exciting and inducing sections of the coil. Furthermore, the exciting and inducing sections of the coil may be so arranged and connected that they are functionally interchangeable through each half cycle of oscillation of the switching circuit to apply unidirectional voltage to the terminal system of the changer, substantially without any A.-C. component.

Figure 1:
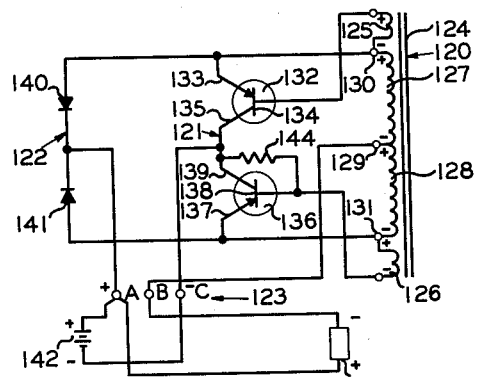

FIG. 1 shows the voltage modifying or changing circuit arranged as a voltage halver for an external circuit presenting common positive connection between the voltage source and the load.

As shown, the changer includes an inductor 120, a switching circuit 121, a control circuit 122 and a terminal system 123.

The inductor 120 includes a saturable core 124, feedback windings 125 and 126 and working coil sections 127 and 128 defined respectively by an intermediate tap 129 and lateral taps 130 and 131.

The switching circuit 121 includes transistors 132 and 136, the transistor 132 having emitter, base and collector electrodes indicated respectively at 133, 134 and 135, the base electrode 134 being connected to one side of feedback coil 125 and emitter electrode 133 being connected to the other side of the same feedback coil. Transistor 136 includes emitter, base and collector electrodes indicated respectively at 137, 138 and 139, base electrode 138 being connected to the side of the feedback coil 126 having concurrent, opposite polarity of that to which the base 134 of transistor 132 is connected and the emitter 137 being connected to the other end of the same feedback coil.

Thus it will be seen at a given instant, assuming the polarities shown in FIG. 1, the base 134 of transistor 132 will be biased positively with respect to emitter 133 thus rendering the transistor 132 non-conducting while the base 138 of the transistor 136 will be biased negatively with respect to emitter 137 thus rendering the transistor in a conducting condition. This driving or biasing of the transistors to render them conducting and non-conducting is in accordance with known practices in the use of semi-conductor devices. While I have shown the use of transistors herein and particularly transistors of the P-N-P type, it will be understood that other electro-responsive devices such as vacuum tubes may be used following the known practices in the application of said devices. Furthermore transistors of the N-P-N type may be used in my circuit by changing polarity connections shown and reversing the direction of current blocking diodes to be described presently. In the use of P-N-P junction transistors as I have proposed, the current flow is in emitter-collector direction and cut-off is by positive bias at the base emitter junction to drive charge carriers from that junction.

As has been indicated previously, with the feedback arrangement disclosed above, the feedback coils 125 and 126 are inductively responsive to the flux created in the core 124. Thus, at any given instant in which the polarities are those shown on the coil in FIG. 1 it will be seen that the transistor 136 has been rendered conducting by application of negative bias to the base electrode 138. The base 138 being negative relative to its emitter 137 reduces the resistance of the transistor 136 to emitter-collector current flow. Simultaneously, the transistor 132 is rendered non-conducting by application of positive bias to the base electrode 134 whereby the latter is driven positive relative to its emitter 133 of the transistor. As the core 124 becomes saturated, the flux activity in the inductor is reversed and therefore polarities shown in FIG. 1 are reversed throughout the coil to reverse the biasing condition applied to the bases of the transistors 132 and 136 to, in turn, reverse their action in accordance with known practice in the semi-conductor art. Therefore transistors 132 and 136 define separate electrical paths through the switching circuit 121.

For protection of the transistors it is desirable to provide some resistive means through which base current must pass. Any well known expedient may be utilized for this purpose or, as contemplated herein, the desired resistance may be incorporated into the respective feedback coils.

As transistor 136 is rendered non-conducting, transistor 132 is rendered conducting to reverse the electrical conditions and operation about to be described. Each of these alternate, several conducting periods of the transistors represents one half cycle of oscillation whereby a full cycle of operation is represented by complete and successive periods of operation of each of the transistors.

It will be understood that any suitable oscillating means may be utilized with my circuit, either in the form of a separate device or incorporated in the voltage modifier as shown herein.

As will be seen, the transistors 132 and 136 are collector connected in series to complete the switching circuit 121 and under such circumstances are disposed in oppositely poled relationship to one another thereby defining separate electrical paths through the switching circuit during any one half cycle of operation.

The control circuit 122 includes oppositely poled rectifying devices 140 and 141 whereby separate electrical paths are defined through the control or rectifying circuit during successive one half cycles of operation. As shown herein I have provided diodes as the current blocking devices but other expedients having sufficient current blocking characteristics for my purposes may be substituted therefore.

The changer circuit is completed by the provision of a terminal system 123 which includes a pair of terminals A and C poled positively and negatively respectively and an electrically intermediate terminal B. The terminal A is connected to the rectifying circuit 122 between diodes 140 and 141, the terminal B to the inductor coil through intermediate tap 129 and the negative terminal C to the switching circuit 121 between the transistors 132 and 136.

The circuit of FIG. 1 is designed to receive common positive source-load connections and to serve as a voltage halver so connected to the source-load network. To complete the circuit the negative side of the load is connected to the intermediate coil tap 129 through intermediate terminal B and the negative side of the voltage source is connected to the switching circuit through terminal C between the transistors 132 and 136. Thus it will be seen that the intermediate tap on the coil is connected to the lower voltage element in the source-load network, namely the load 143.

As will be seen presently, in any given half cycle of oscillation for voltage halving, assuming tap 129 to be a coil mid-tap and taps 130 and 131 to be symmetrical with respect to the working coil and tap 129, the latter is the electrical equivalent of a mid-tap on the source 142 to apply one half of source voltage to the load and yet, the entire source voltage is utilized in the circuit without the incorporation into the circuit resistive or dissipative components and their attendant losses. Furthermore, because of my invention and the application of the entire voltage to the circuit, the battery is evenly discharged to greatly simplify and also to considerably reduce the expenses of the voltage charging operation.

Assuming now that polarity conditions are as shown on the coil in FIG. 1 and thus transistor 136 has been rendered conducting and transistor 132 is cut-off, it will be seen that the voltage source 142 is connected across the coil sections 127 and 128 through terminals A and C, transistor 136 and diode 140 respectively, diode 140 being rendered conductive by the flow of load current as will be shown presently. On the other hand, the load 143 is connected only across the coil section 127 through terminals A and B, and diode 140. The load voltage is thus one half of the source voltage to accomplish the results desired.

In the circuit of FIG. 1, as well as those of all other modifications described herein it will be seen that the establishment of inducing and exciting coil sections in the inductor coil can be confirmed by the phenomenon that any electrical device in which current enters at the positive terminal and leaves at the negative terminal is established as a load, such as the exciting coil sections in the present circuits and when current enters at the negative pole and leaves at the positive pole there is established an electrical source such as the inducing coil sections in the present circuits.

The instantaneous electrical condition in the circuit of FIG. 1, being as described above, it will be seen that current flowing from the negative pole of the load passes through terminal B and into the inductor coil at mid-tap 129. At this point the current divides and flows from the coil in equal amounts through lateral taps 130 and 131. Current flowing from the lateral tap 131 passes through transistor 136, negative terminal C and into the negative pole of the source 142. Current flowing from lateral tap 130 passes through the diode 140 to terminal A where it joins current from the positive pole of the source 142 and passes to the positive pole of the load. Thus it will be seen that the load current is twice the source current.

From the foregoing, it will be seen that coil section 127 is established as the inducing coil section while 128 is the exciting coil section. Since the load is connected only across inducing coil section 127 which represents one half of the inductor coil, and the source is connected across both the exciting and inducing coil sections, voltage one half that of the source will be applied to the load.

It will be understood that in the succeeding one half cycle of oscillation, the core 120 having become saturated as previously described, transistor 132 will be rendered conducting and transistor 136 will be cut-off. Under these circumstances, the coil polarities having been reversed, coil section 127 now becomes the exciting coil section and 128 the inducing coil section. Consequently again, voltage across the inducing coil section only will be applied to the load through lateral tap 131, diode 141 and terminal A and intermediate tap 129 and terminal B.

Additionally it will be seen that under these conditions voltage of like direction from that applied in the former half cycle will be applied to the terminal system and thus to the lead.

Therefore, there has been applied to the load throughout a full cycle of oscillation, voltage representing half of that of the source and this voltage, as applied to the load, is unidirectional.

Ordinarily inherent asymmetry in the circuit will afford immediate firing of either transistor 132 or 136. However, if assurance against failure of the circuit to start is desired, a suitable resistance 144 may be connected between the base electrode of one of the transistors and the negative side of the source voltage. This connection will assure negative bias as shown, on the base of the transistor to which it is connected and thus assure that transistor starting immediately. In FIG. 1 this starting resistance 144 is connected across the transistor 136. This expedient may of course be utilized in any or all of the other modifications shown and described herein.

An important factor in the principle of my invention is the improved, accurate, predetermined regulation of the voltage applied across the load and from the foregoing it will be seen that the combination of the components set forth affords an unusually accurate division of voltage by inductive action of the coil of the inductor 120.

Figure 2:
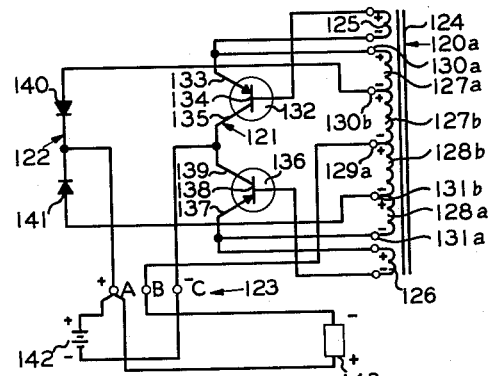
Figure 3:
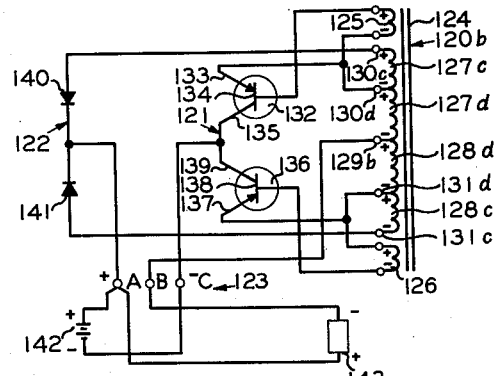

In accommodating my invention to field conditions requiring a reduction of source voltage other than simple halving as shown in FIG. 1, I have provided the circuits shown in FIGS. 2 and 3. These voltage reducing circuits are similar to that described in conjunction with FIG. 1 with the exception of the symmetrical, lateral taps on the inductor coil. Accordingly like parts bear similar identification in FIGS. 1, 2 and 3.

The circuit shown in FIG. 2 is designed to afford fractionalizing of source voltage throughout a ratio from zero to one half of source voltage.

In this circuit the inductor coil is provided with an intermediate tap 129a, and a set of lateral taps on each side thereof, including fixed, outer lateral taps 130a and 131a and adjustable inner lateral taps 130b and 131b. It is to be particularly noted that in this circuit the emitter electrodes 133 and 137 of transistors 132 and 136 respectively and thus the switching circuit, is connected to the outer fixed lateral taps 130a and 131a while the control or rectifying circuit 122 and diodes 140 and 141 are connected to the adjustable, inner lateral taps 130b and 131b.

It will also be noted that, as in the circuit of FIG. 1, the respective electro-responsive devices and diodes on each side of the intermediate tap are similarly poled.

Again, assuming under conditions described in conjunction with FIG. 1, the transistor 136 is rendered conducting and assuming that the polarities at a given instant are those shown in FIG. 2 it will be seen that the voltage source 142 is connected across the coil windings 127b, 128a and 128b through the terminals A and C, transistor 136 of the switching circuit 121 and diode 140 of the rectifying circuit 122, while the load 143 is connected through terminals A and B and diode 140 across the inducing coil section 127b. Again, diode 140 is rendered conducting by the passage of load current therethrough.

In this form of my invention, the exciting coil section in one half cycle of operation will be the inductor coil sections 128a and 128b while the inducing section will be coil section 127b. In the other half cycle of oscillation, upon reversal about intermediate tap 129a, sections 127a and 127b become the exciting coil section and section 128b becomes the inducing coil section. Thus it will be seen that in this form of the invention, due to the adjustability of taps 130b and 131b, the inducing section is variable in accordance with the position of these taps.

From the foregoing it will be seen that, in all of the circuits shown, with each reversal due to switching, an a-c component is substantially eliminated from the unidirectional output of my voltage modifier since each coil section, although reversed in position with respect to the intermediate tap, still bears the same relative position to the coil. In other words, considering the outer lateral taps and the intermediate tap as the outer limits and center respectively of the coil, in each half cycle of oscillation about the intermediate tap, the turn ratio and the relative position on the coil of each section is the same. Hence, like electrical conditions are applied across the terminal system during each succeeding half cycle of oscillation because of the symmetry of position of the exciting and inducing coil sections throughout a complete cycle of oscillation.

In view of the previously described interchangeability of function between exciting coil sections and inducing coil sections with respect to the intermediate tap on the coil it will be understood that symmetry of all taps with respect to the coil is desirable in order that substantially all A.-C. component may be eliminated from the output of the voltage changer and so that the proper fractional ratio of unidirectional source voltage is applied to the terminal system and thus to the load.

With respect to FIGS. 2 and 3 it will be understood that in making adjustments for varying ratios and to preserve the above mentioned symmetry, the inner lateral, adjustable taps will both be adjusted through like symmetrical movement with respect to the mid-tap 129a.

At the instant of coil polarity shown in FIG. 2, with the exciting coil including coil sections 128a and 128b and the inducing coil comprising coil section 127b, it will be seen that again the current flows to tap 129a and is accurately proportioned in accordance with the turn relationship between the total exciting coil section 128a, 128b and the inducing coil section 127b, due to the inductive effect of inductor 120. Thus at the instant shown, with transistor 136 in current conducting condition, the coil including sections 128a and 128b comprise the exciting coil section, and section 127b is the inducing coil section. For the next half cycle of operation the coil section represented as 127a and 127b becomes the exciting section and the coil section 128b, the counterpart of coil section 127b, now becomes the inducing section as delimited by intermediate tap 129a and adjustable tap 131b. Again the voltage source is connected across both the exciting and inducing coil sections while the load is connected across only the inducing coil section and the ratio of turns between taps 130b and 131a and those between taps 129a and 130b represents the voltage modification, in this case fractionalizing, which is obtained.

Considering now the limits of position of adjustable taps 130b and 131b it will be seen that if they are moved inwardly to a point where they coincide with intermediate tap 139a, then, upon operation of the device no voltage will be applied to the load. On the other hand if the adjustable taps are moved outwardly until they coincide respectively with fixed, outer, lateral taps 130a and 131a it will be seen that the conditions described in conjunction with FIG. 1 have been attained, namely that the device has become a voltage halver. It will be obvious therefore that in the circuit of FIG. 2 the adjustment will be delimited by a zero voltage ratio or a voltage halving ratio.

In the circuit of FIG. 2 the load and source connections and the operation is similar to that explained in conjunction with FIG. 1.

In the circuit shown in FIG. 3 there are again provided fixed, outer, lateral taps 130c and 131c, an intermediate tap 129b and adjustable, inner, lateral taps 130d and 131d.

In this circuit it will be noted, as differentiated from that of FIG. 2, that the control or rectifying circuit 122 is connected to the fixed, outer lateral taps 130c and 131c while the switching circuit and particularly the emitter electrodes of transistors 132 and 136 are connected to the inner adjustable coil taps 130d and 131d. Thus the switching circuit 121 and the source 142, instead of the controlling or rectifying circuit 122 and the load 143 are connected to the adjustable taps.

With this construction the inducing section is always fixed in the number of turns it contains and (assuming transistor 136 to be conducting for purposes of description) is represented by coil sections 127c and 127d while the active exciting coil section 128d is variable in the number of turns it contains in accordance with movement of the inner, lateral adjustable taps 130d and 131d.

Again, the source 142 is connected across both the exciting section and the inducing section of the coil through terminals A and C while the load 143 is connected across the inducing section through terminals A and B.

As taps 130d and 131d are moved outwardly to coincide with fixed, outer, lateral taps 130c and 131c, the conditions shown in FIG. 1 namely, that of a voltage halver will be attained, while, as these adjustable taps are moved symmetrically toward the center tap 129b the voltage fractionalizing ratio is increased until a one to one source-load ratio is attained.

From the foregoing it will be seen that I have provided novel circuitry whereby, without utilizing intermediate taps on the voltage source there may be applied to the load, fractions of the source voltage from zero to voltage equal to the source and that, with the circuitry provided, the unidirectional characteristics of the source voltage are applied to the load.

As indicated previously, if substantially pure unidirectional voltage is desired as the output of my voltage modifier, the intermediate taps shown in the various modifications should be centrally disposed with respect to the inducter coil.

In the event however, that it is desirable to provide, as the output of the voltage modifier, a substantially unidirectional voltage with an A.-C. component therein, it is merely necessary to dispose the intermediate tap to one side or the other of the mid-point of the coil an amount corresponding to the magnitude of A.-C. component desired. This concept is of course applicable to any of the forms of my circuit shown herein.

Figure 4:
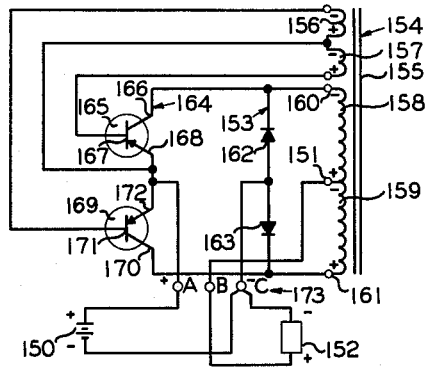
Figure 5:
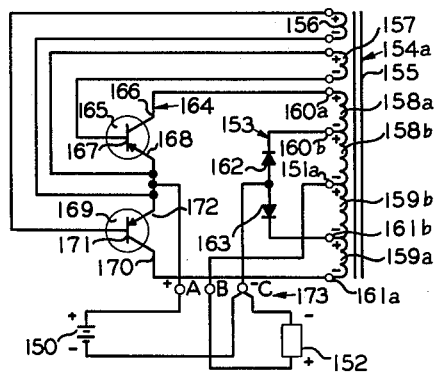
Figure 6:
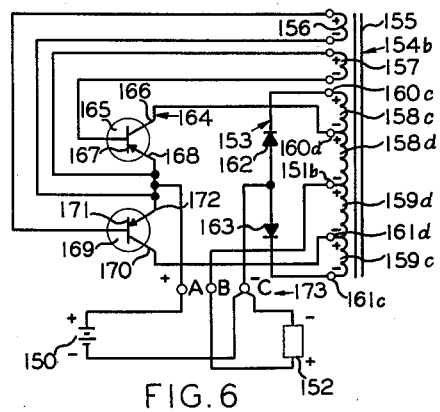

To the end that a voltage reducer embodying my invention and containing the commercially economical features of a two transistor circuit may be applied to a source-load network having common negative source-load connections I have provided the arrangements shown in FIGS. 4, 5, and 6.

Essentially the circuit of FIG. 4 differs from that of FIG. 1 in that, the positive instead of the negative pole of the load 152 is connected through the intermediate terminal B to the intermediate coil tap 151, while the positive side of the source 150 is connected directly to the changer circuit through switching circuit 164 and positive terminal A.

The essential similarity between the circuits of FIGS. 1 and 4 are that the common terminal is connected to the respective rectifying circuit between the diodes therein and the other pole of the load is connected to the intermediate tap of the inductor coil through the electrically intermediate terminal B of the terminal system. The other pole of the voltage source is connected directly to the switching circuit between the electro-responsive devices therein through the terminal of opposite polarity from that which is commonly connected to the load and the source. This insures that the voltage source is connected across both the exciting and the inducing coil sections and that the load is connected across the inducing section only, to give voltage fractionalizing action as previously explained. These common factors impart to the circuits of FIGS. 4, 5 and 6 all of the attributes and advantages previously described in conjunction with FIGS. 1, 2 and 3.

Referring first to FIG. 4 it will be seen that the voltage fractionalizer in this form includes an inductor 154 having a core 155 on which are wound feedback coils 156 and 157 and working coil sections 158 and 159 delimited centrally by intermediate tap 151 and laterally by fixed lateral taps 160 and 161.

The control or rectifying circuit 153 includes oppositely poled, electrically unidirectional devices such as diodes 162 and 163 and, as shown, the switching circuit 164 includes a transistor 165 having collector base and emitter electrodes 166, 167 and 168 respectively together with oppositely poled transistor 169 including collector, base and emitter electrodes 170, 171, and 172 respectively. Again, transistors and diodes respectively on the same side of the intermediate tap are similarly poled to establish alternately operative, separate electrical paths in the circuits.

It will be noted that in this circuit the transistors again are in series but here are emitter connected and that the base electrode of each is connected to one of the taps on each of the feedback coils 156 and 157, these taps being those which are concurrently of opposite polarity in any given instant of circuit operation. The emitter of each transistor 165 and 169 is in turn connected to the other tap of the respective feedback coil 156 and 157. Again, there is provided a terminal system 173 including positive terminal A, electrically intermediate terminal B and negative terminal C.

The negative poles of the voltage source 150 and load 152 are connected to common negative terminal C, the positive pole of the load to intermediate tap 151 on the inductor coil through intermediate terminal B and the positive pole of the source 150, to an intermediate point on the switching circuit 164 through terminal A to again insure the proper establishment of exciting and inducing coil sections.

Assuming, for purposes of description that the working coil has the polarities shown on FIG. 4, and the transistor 169 has been rendered conducting while the transistor 165 is rendered non-conducting by the feedback coil polarities shown, it will be seen that the voltage source 150 through terminals A and C is connected across the coil sections 158 and 159, the section 159 being established as the exciting coil section while the section 158 becomes the inducing coil section. The load 152, on the other hand, through the terminals B and C and diode 162, is connected only across the inducing coil section 158 to afford the voltage halving action, assuming the number of turns in the coil sections 158 and 159 to be the same.

In the circuit of FIG. 4 current flows from the positive terminal of the voltage source 150 through the terminal A, in emitter-collector direction through transistor 169, lateral tap 161 which is positively poled, intermediate tap 151 and intermediate terminal B to the positive pole of the load. Current from the load passes from the negative pole thereof to terminal C where it divides, part of the current flowing to the negative pole of the source 150. The other portion of the current from the load flows from terminal C through diode 162 and into coil tap 160 to inducing coil section 158.

From the standpoint of voltage potentials involved it will be seen that in the circuit of FIG. 4 the voltage source 150 is applied across the exciting coil section 159 and the inducing coil section 158 while the load 152 is connected, through terminals B and C across only the inducing coil 158. Hence the voltage applied across the load is half that of the source voltage by virtue of the inductive action of inductor 154.

FIGS. 5 and 6 are similar to FIG. 4 except with respect to the provision of inner, adjustable lateral taps on the inductor coil windings, and therefore those parts which are similar are similarly identified.

The circuit of FIG. 5 is a voltage fractionalizer circuit adapted to accommodate itself to common negative connections between the source and the load and is further adapted to provide reduction of the source voltage from zero to one half of the source voltage while FIG. 6 is a common negative connected voltage reducer arranged to provide voltage reduction from one half of the source voltage to a voltage equal to source voltage.

In the circuit of FIG. 5, with the transistor 165 conducting at the instant taken for purposes of description and the polarities existing as shown on the coil, the voltage source 150 is connected across the exciting coil made up of coil sections 158a and 158b through terminals A and C while the load is connected across the inducing coil section 159b through terminals B and C. The function, advantages and attributes of this circuit are similar to those described for FIG. 2 giving the same range of ratios as there described.

In the circuit of FIG. 6, assuming transistor 165 to be conducting, the load 152 is connected across the inducing coil made up of coil sections 159c and 159d through terminal C, diode 163, terminal B and intermediate coil tap 151b while the voltage source is connected to the variable exciting coil section 158d and the inducing coil sections 159c and 159d through terminals A and C and by operation of transistor 165.

Again, since it is the exciting section which is variable, it will be seen that by continued reduction of the number of turns through movement of the variable taps 160d and 161d symmetrically inwardly toward the center tap 151b, fractionalizing ratios of from one half source voltage to a voltage equal to source voltage can be established as described with respect to the circuit of FIG. 3.

From the foregoing it will be seen that I have provided circuits which are available to give source voltage reduction or fractionalizing in ratios from zero to a load voltage equal to that of the source where either common negative or common positive source-load connections are encountered.

Additionally it will be seen that I have accomplished the foregoing advantages by the novel combination of elements previously described whereby the intermediate tap on the inductor coil is the practical equivalent of a tap on the voltage source without he attendant disadvantages of such a source tap.

In the circuits of FIGS. 1 and 4 the intermediate coil tap serves as a mid-tap on the voltage source to give source voltage halving action while the inner, lateral adjustable taps in the circuits of FIGS. 2, 3, 5 and 6 are so arranged with respect to the intermediate coil taps to give the wide range of ratios previously described.

It will also be seen that, with the features of my invention described above I have provided for the oscillating, alternate and several interchange of function between the exciting and inducing coil sections whereby unidirectional source voltage is modified and applied to the load as unidirectional voltage.

Furthermore it will be seen that I have provided voltage modifier circuitry whereby an intermediate tap on the inductor coil is established as the point about which the interchange between exciting and inducing functions of the coil sections takes place upon termination of each half cycle of oscillation and also is, in each case, connected with the lower voltage element in the source-load network, namely the load.

While voltage reducing or fractionalizing is a common requirement in both the industrial and communication fields, requirements for voltage multiplication, polarity changing and adaptation of two poled voltage sources to a three wire distribution system must be taken into consideration.

With these additional requirements in mind, in providing the voltage fractionalizing circuits heretofore described I have also so arranged the components that, as will be seen presently, they may be applied readily to voltage multiplying, polarity changing and to connection to three wire distribution systems.

Figure 7:
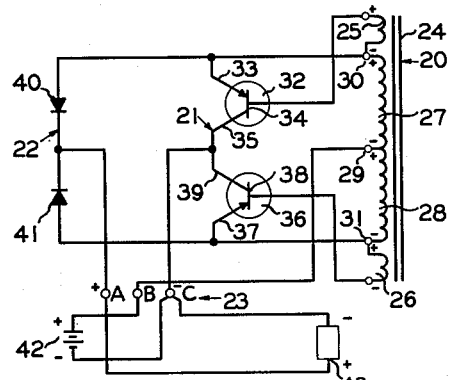

The circuit of FIG. 7 will be found to be similar to that of FIG. 1 and, as shown, is connected to a source-load network which is common negative connected.

Figure 8:
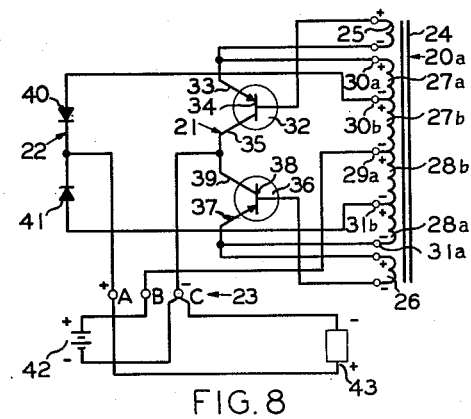
Figure 9:
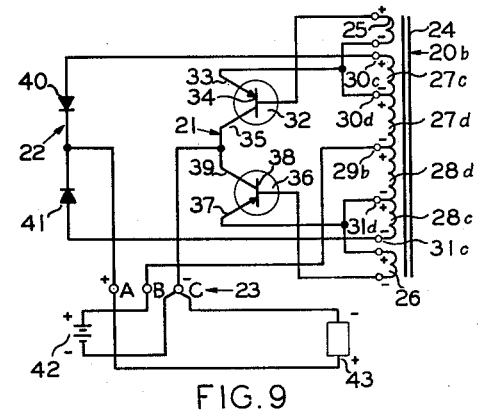

In FIGS. 7, 8 and 9 similar components to those of FIGS. 1, 2 and 3 are designated by numerals having digits and suffix letters corresponding to the last two used on the parts shown in FIGS. 1, 2 and 3.

In the form of the invention shown in FIG. 7 it will be seen that the voltage source 42 is connected across the exciting coil section 28 through terminals B and C and (assuming transistor 36 to be conducting at this instant) and through that transistor, while the load is connected across the inducing coil section 27 and exciting coil section 28 through terminals A and C, lateral taps 30 and 31, diode 40 and transistor 36. Additionally the intermediate tap 29 of the coil is connected to the element of the source-load network having the lower voltage, namely the voltage source 42.

Under these circumstances it will be seen that the circuit of FIG. 7 will produce voltage doubling action assuming the number of turns on coil sections 27 and 28 to be the same. Thus the arrangement of FIG. 7 constitutes a voltage doubler for connection with a common negative connected source-load network.

In the circuit of FIG. 7 source current flows from the positive pole of the source, through terminal B and tap 29 to the inductor coil where it divides inductively into equal parts between coil sections 27 and 28. Flow of current from the inductor coil is through lateral taps 30 and 31, current through the tap 30 passing through the diode 40, terminal A and to the load while current from tap 31 flows through transistor 36, to terminal C where it joins current from the load and is returned to the negative pole of the source.

As has been explained previously the foregoing description represents one half cycle of oscillation and upon saturation of the core 24 the coil polarities shown in FIG. 7 are reversed whereby transistor 32 is rendered conducting and transistor 36 is now cut-off. Under these circumstances coil section 28 now becomes the inducing coil section while coil section 27 becomes the exciting coil section. As this occurs the load is again connected across the entire coil section through terminals A and C, transistor 32 and diode 41 while the voltage source 42 is connected across the exciting coil section 27 through terminals B and C and transistor 32.

Thus, in this form of my invention, the load being connected across the coil sections 27 and 28 in each succeeding half cycle of oscillation, and the source being connected across only the then exciting coil section, the voltage applied across the load is double that of the source voltage.

In the form of my invention shown in FIG. 8 the arrangement constitutes a voltage multiplier and is adapted to give voltage multiplication in the range from source voltage to double source voltage.

In this form of my invention again, the principle difference from the voltage doubler shown in FIG. 7 is the arrangement of the coil taps and the inclusion of symmetrically adjustable, inner lateral taps 30b and 31b.

In the circuit of FIG. 8 and also that of FIG. 9 those parts similar to those previously described in conjunction with FIG. 7 are similarly identified.

In the circuit of FIG. 8 it will be seen that the inner, lateral adjustable taps 30b and 31b are connected to the control or rectifying circuit 22 which includes oppositely poled diodes 40 and 41 while the outer, lateral fixed coil taps 30a and 31a are connected to the switching circuit 21 which includes transistors 32 and 36, the latter in the circuit of FIG. 8 being collector connected.

Considering now the limits of position of the adjustable taps 30b and 31b it will be seen that if they are moved inwardly to a point where they coincide with intermediate tap 29a, then upon operation of the device only source voltage appearing across the switching circuit and the exciting coil, will be applied to the load. Thus the load-source voltage will be substantially a one to one ratio. On the other hand if the adjustable taps are moved outwardly until they coincide respectively with fixed outer lateral taps 30a and 31a it will be seen that the conditions described in conjunction with FIG. 7 have been attained, namely, the device will become a voltage doubler. Thus all ratios between these limits may be obtained by symmetrical movement of the adjustable taps. In the circuit of FIG. 8 the load and source connections to the exciting and inducing coil sections are those explained in conjunction with FIG. 7.

In the circuit shown in FIG. 9 there are provided fixed outer lateral taps designated as 30c and 31c and intermediate tap 29b together with adjustable inner lateral taps 30d and 31d.

In this circuit it will be noted, as differentiated from that of FIG. 8, that the rectifying circuit 22 is connected to the fixed outer lateral taps 30c and 31c while the switching circuit and particularly the emitter electrodes of transistors 32 and 36 are connected to the inner adjustable coil taps 30d and 31d.

Accordingly, in this circuit (assuming transistor 36 to be conducting) the inducing coil including coil sections 27c and 27d is always fixed in the number of turns it contains and the exciting coil section 28d is variable in the number of turns it contains in accordance with the movement of the inner, lateral adjustable tap 31d.

In the circuit of FIG. 9, which is designed to afford voltage multiplication from twice the source voltage to a very high multiplication thereof, it will be seen that the source 42 is connected across the exciting section 28d of the coil through terminals B and C while the load 43 is connected across the entire active section of the coil made up of the exciting section 28d and inducing coil sections 27c and 27d through terminals A and C.

Since the circuit of FIG. 9 is designed to afford voltage multiplication from twice the source voltage to a very high multiple thereof, the objective in connecting the switching circuit 21 to the adjustable taps 30d and 31d will be readily seen. Such an arrangement establishes the variable coil section 28d as the exciting section. Therefore as the coil section 28d is reduced in the number of turns therein, the ratio between the fixed length of inducing coil sections 27c and 27d thereto can become very high as the adjustable taps 30d and 31d are moved in a direction to approach the intermediate tap 29b. On the other hand as taps 30d and 31d are moved outwardly symmetrically to coincide with the fixed outer lateral taps 30c and 31c the condition shown in FIG. 7, that of a voltage doubler, will be attained.

Since, in the present examples of my invention, there is shown a saturable core for purposes of oscillation, it will be seen that if the number of turns in the power winding is reduced, as in the case of adjustable tap devices shown in FIGS. 2, 3, 5, 6, 8 and 9 described above and those shown in FIGS. 11, 12, 14 and 15 to be described presently, the frequency of oscillation will increase, thereby to maintain a substantially constant peak flux density. Thus the components shown in my circuit are enabled to afford the stated voltage modification functions.

With my device it wil be seen that as the voltage per turn of the coil section is increased due to decrease in the number of turns therein the frequency of oscillation will increase in proportion to the voltage per turn. Thus with the structures shown, there is provided compensating action to afford proper operation of the device.

If external oscillating means is provided, then it may be necessary to adjust the frequency of oscillation to obtain the peak flux density desired for the particular inductor.

Thus, by movement of the adjustable taps any voltage ratio between the limits defined above can be obtained.

Figure 10:
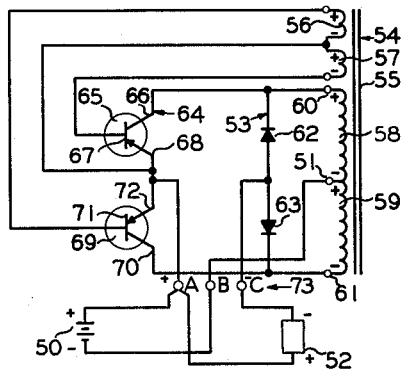
Figure 11:
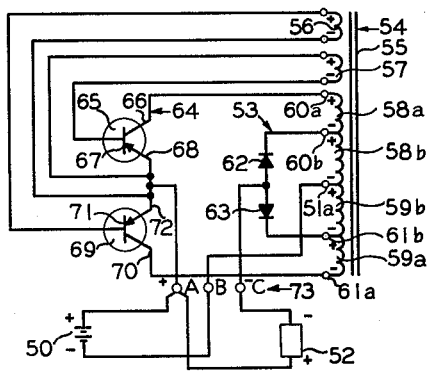
Figure 12:
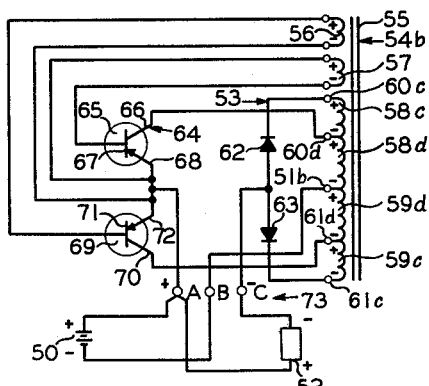

To the end that a voltage multiplier embodying my invention and having the commercially economical features of a two transistor circuit may be applied to a network having common positive source-load connections, I have provided the arrangements shown in FIGS. 10, 11 and 12.

Essentially, the circuit of FIG. 10 differs from that of FIG. 7 in that the positive rather than the negative pole of the voltage source 50 is common connected while the negative rather than the positive pole of the load 52 is connected directly to the control circuit 53 through negative terminal C.

The essential similarities between the circuit of FIGS. 7 and 10 are that the common terminal is connected to the respective switching circuit between the electro-responsive devices therein; the other pole of the source is connected to the intermediate tap of the inductor coil through the intermediate terminal of the terminal system; the other pole of the load is connected directly to the rectifying circuit between the diodes therein through the terminal of opposite polarity from that which is common to the load and the source.

In FIGS. 10, 11 and 12 components similar to those of the circuits shown and described in FIGS. 4, 5 and 6 are designated by the last two digits and the suffix letters of the identifying numerals in FIGS. 4, 5 and 6.

In the voltage modifier of FIG. 10 the rectifier circuit 53 and the switching circuit 64 are both connected across lateral coil taps 60 and 61. The source 50 is connected, through terminals A and B, across the exciting coil section 58 by transistor 65 (assuming the latter to be conducting in the half cycle of oscillation being described) while the load 52 is connected, through terminals A and C, transistor 65 and diode 63 across the entire inductor coil including exciting section 58 and inducing section 59.

Under these circumstances source current flows from the positive terminal of the source, through transistor 65 and tap 60 into the inductor coil and from the negative pole of the load through terminal C and diode 63 into tap 61 of the coil. Current flowing from the inductor coil passes through terminal B to the negative side of the source, it being understood that there is a division of current at terminal A.

The flow of current described above establishes the inductor and exciting coil section relationships as previously described, with the result that double the source voltage is applied to the load since the latter is connected across the entire working coil of the inductor.

In the circuit of FIG. 11 there is shown a voltage modifier adapted to adjustably afford voltage multiplying ratios in a range from source voltage to double that voltage.

In this form of my invention, as distinguished from the circuit of FIG. 8 the voltage modifier is adapted to accommodate a source-load network having common positive connections.

Again, as in the circuit of FIG. 8 it will be noted that the inner, lateral, adjustable taps 60b and 61b on the coil are connected across the rectifying circuit 53 while the outer, lateral, fixed taps 60a and 61a are connected across the switching circuit 64.

The adjustable relationships between the inner, lateral taps 60b and 61b of the circuit of FIG. 11 and the multiplying action of the circuit follow the principles described in conjunction with the circuit of FIG. 8 and will not therefore be further described here.

The circuit of the voltage modifier shown in FIG. 12 is arranged to afford voltage multiplication from double the source voltage to a very high multiple thereof.

Here, as in FIG. 9, the adjustable coil taps 60d and 61d are connected across the switching circuit 64 while the outer, fixed, lateral taps 60c and 61c are connected across the rectifying circuit 53.

The functions and relationships involved in the operation of the circuit of FIG. 12 are similar to those described in conjunction with FIG. 9 and will therefore, not be further described here.

From the foregoing it will be seen that the voltage modifier embodying the principles of my invention and shown in FIGS. 1 to 12 may be adapted to afford an infinite range of voltage modification including voltage fractionalizing and voltage multiplying and is also adaptable to common positive or common negative source-load networks, this being brought about by my novel arrangement and combination of switching means, rectifying means, inductor means and terminal connections.

While the exemplary voltage source shown herein is in the form of a battery it will be understood that any suitable source of unidirectional voltage may be used and it is contemplated as within the scope of my invention that the inductive action and arrangement of the components I have proposed will serve not only to modify the unidirectional voltage in the manner desired but also to impart the characteristic of constancy to the unidirectional voltage output, with respect to load variation.

In view of the above it will be seen that the voltage modifier circuits I have provided are available for the various functions described, are economical in the simplicity thereof and are selectively available for many combinations of common load-source connections and voltage fractionalizing or voltage multiplying demands.

To the end that a voltage modifying circuit may be provided which will accommodate either common negative or common positive connections and either voltage fractionalizing or multiplying requirements in any combination, and to afford operation under load conditions approaching no load, I have provided a circuit of the type shown in FIG. 13.

As will be seen, the circuits of FIGS. 13, 14 and 15 are advantageous in that they will accommodate all common negative and common positive conditions shown and described in conjunction with FIGS. 1 to 12, will, in the forms shown, give both multiplying and fractionalizing modifications in all ranges from zero to a very high ratio and will operate under no load conditions.

These features of my invention as shown in FIGS. 13, 14 and 15 are attained by the provision of switching and rectifying circuits which are functionally interchangeable. This interchangeability is accomplished by the use of transistors of the type which, in their transistor function, pass current in emitter-collector direction when a negative bias is applied to the base electrode with respect to the emitter electrode thereof and yet, which will pass current in collector-emitter direction, under conditions existing in the circuit embodying my invention. Under such conditions, as will be seen, the transistors so functioning will serve the same purpose as the diodes in the rectifying circuits of FIGS. 1 to 12 in that they pass current in collector-emitter direction. This is due to what is known as inverted operation of a transistor. Under such circumstances the emitter shown acts as a collector and the collector shown acts as an emitter and the transistor operates to pass current fully in collector-emitter direction in the manner of the diodes in FIGS. 1 to 12 and as opposed to its normal transistor action.

Considering FIGS. 1 to 12 and particularly FIGS. 1 and 4 for purposes of explanation, it will be seen that in each half cycle of oscillation, diagonally disposed transistors and electrically unidirectional devices or diodes function to pass current through the selected, alternate current paths already described. In the case of FIG. 1 the flow through diode 140 and transistor 136 is toward the terminal system. In the case of FIG. 4, however, flow through for instance, diode 163 and transistor 165 is toward the respective lateral taps. Both of these conditions are simulated in the circuits of FIGS. 13 to 15 by the use of transistors only, so that the switching and rectifying activity of the circuits can be interchanged as required by the particular circuit arrangement between my voltage modifier and the particular source-load network to which it is connected.

In the circuits of FIGS. 13, 14 and 15, let it be assumed for the purpose of description that circuit 201 is called upon to serve as the switching circuit (similar to FIG. 1) with transistor 215 conducting, then circuit 202 will serve as the rectifying circuit with transistor 222 passing load current in collector-emitter direction under inverted transistor action as described above. This, of course, is due to the fact that load current is directed through the upper half of circuit 202 as viewed in FIGS. 13, 14 and 15, and transistor 223, like 214 is biased positively at the base to be rendered non-conducting. Under such conditions, transistor 222 passes current in the desired collector-emitter direction as in the case with comparable diodes in the circuits of FIGS. 1 to 12 while companion transistor 223 in the then rectifying circuit will not pass current due to its non-conducting condition. Thus, while transistors in the rectifying circuits of FIGS. 13 to 15 are not diodes as such, they serve the same function, in that they can pass load current in the desired direction due to inverted transistor operation and therefore the overall rectifying circuit operation is like that of FIGS. 1 to 12. Another factor in this diode-like action of the transistors is that the companion transistor in the then rectifying circuit is rendered non-conducting due to its cut-off condition.

Thus it will be seen that in FIGS. 13 to 15, the transistors in the then rectifying circuit will function in the manner of electrically unidirectional devices yet are available as switching transistors when that particular circuit is called upon to act as a switching circuit.

The simulation of circuit conditions of, for instance, FIG. 4 will be readily understood from the above explanation. In that case, circuit 201 acts as the rectifying circuit and transistors 214 and 215 serve their diode-like activity.

Consequently I consider the diode acting transistors to fall within the scope of the term "electrically unidirectional" devices as used herein since, under the operating conditions of my circuits described above, they serve as such under certain arrangements to be described although they are also available as switching transistors for alternate arrangements.

Referring to FIGS. 16 to 19 it will be seen that FIGS. 16 and 17 represent, respectively, common negative and common positive source-load connections and in each case the intermediate terminal B is connected to the load; to the positive side of the load in FIG. 16 and to the negative side of the load in FIG. 17. Therefore, as was shown in the circuits of FIGS. 1 to 6, voltage fractionalizing is obtained. Here again, the network element having the lower voltage, in this case the load, is connected to the intermediate tap on the inductor coil.

On the other hand the circuits of FIGS. 18 and 19 represent respectively, common negative and common positive connections in which the intermediate terminal B is connected to the source, the network element having the lower voltage; to the positive side of the source in FIG. 18 and to the negative side of the source in FIG. 19. Thus as shown in the circuits of FIGS. 7 to 12, these arrangements are adaptable to voltage multiplying activity.

Referring now to FIG. 13 it will be seen that there is provided an inductor 200 and circuits 201 and 202 which I shall term herein "dual acting circuits" in that each is selectively adapted to function as either the switching circuit or the rectifying or control circuit as shown for instance at 121 and 122 in FIG. 1.

Additionally, there is again provided the three terminal system 203, terminal A being positive, terminal B being electrically intermediate, and terminal C being negative.

The inductor 200 includes a core 204 on which is provided feedback windings 205, 206, 207 and 208 together with working windings 209 and 210. The inner ends of windings 209 and 210 are defined by an intermediate tap 211 which is disposed centrally of the lateral taps 212 and 213 of the working coil.

Dual acting circuit 201 is provided with electro-responsive devices such as transistors 214 and 215 connected in series by collector connection. The transistor 214 is provided with emitter, base and collector electrodes 216, 217 and 218 respectively while transistor 215 is provided with emitter, base and collector electrodes 219, 220 and 221 respectively.

Dual acting circuit 202 is provided with transistors 222 and 223 which are connected in series by emitter connection. The transistor 222 includes collector, base and emitter electrodes 224, 225 and 226 respectively while the transistor 223 is provided with collector, base and emitter electrodes 227, 228 and 229 respectively.

As will be seen, the emitter electrode 216 and the collector electrode 224 of transistors 214 and 222 respectively are connected to the lateral tap 212 of the coil section while the emitter-electrode 219 and the collector-electrode 227 of transistors 215 and 223 respectively are connected to the other lateral tap 213.

By reference to the circuits previously described and shown in FIGS. 1 to 12, it will be seen that in each case, assuming emitter-collector conductivity of the transistors, transistors and diodes connected to like sides of the working coil with respect to the intermediate tap are similarly poled.

As already indicated, each of the circuits 201 and 202 is called upon, under varying conditions, to act on the one hand as a rectifying circuit and on the other hand as a switching circuit as the functions of such circuits have been previously defined. As previously explained, when called upon to act as rectifying circuits, there is utilized the characteristic of a transistor to operate as a diode and pass current in collector-emitter direction.

It will be noted in FIGS. 13, 14 and 15 that in each case the respective transistors on each side of the intermediate tap are respectively collector and emitter connected to the same side of the working coil. Thus the transistors on each side of the intermediate tap are oppositely poled when considered as transistors but, as in the cases of FIGS. 1 to 12 they are similarly poled and pass load current in the same direction when one is considered in the light of its transistor function and the other in the light of its diode function as described above.

Thus, as will be seen, the feedback arrangement impresses opposite base electrode polarity not only upon transistors in the same switching-rectifying circuit but also it impresses opposite polarity to base electrodes of transistors on the same side of the intermediate tap. This action, as in the circuits of FIGS. 1 to 12 establishes the diagonal operating relationship between transistors.

Another characteristic of the circuits shown in FIGS. 1 to 12 is that in all voltage multipliers the circuit electrically connected to the common terminal functions as the switching circuit, whereas, in all fractionalizers the circuit connected with the common terminal functions as the rectifier circuit. Additionally, in each half cycle of oscillation, the working coil section on the same side of the intermediate coil tap as the then operating transistor, is the then exciting coil section. Similarly, the working coil section on the same side of the intermediate tap as the then acting diode, is the then inducing coil section. It is this relationship of the source-load circuit, the terminal system, the changer circuit and the inductor coil which establishes the various working coil sections of the inductor as either exciting or inducing coil sections as previously described, to afford the desired multiplying or fractionalizing action.

First, considering the voltage changer circuit of FIG. 13 in its use as a voltage multiplier, if common negative conditions are encountered the source-load circuit of FIG. 18 is applied thereto. Under the principles of my invention stated above it will be seen that terminal A is connected to dual acting circuit 202 whereupon the latter becomes the diode or rectifying circuit as previously pointed out in FIG. 7 while dual acting circuit 201, being connected to the common negative terminal, will operate as the switching circuit and transistors 214 and 215 will operate in their normal manner. Since, as in the arrangement of FIG. 7, the intermediate terminal B is connected to the voltage source, this arrangement including circuits of FIGS. 13 and 18 will operate effectively as a voltage multiplier (in this particular case a voltage doubler) with common negative source-load connections similar to the circuit of FIG. 7.

On the other hand if the source-load circuit of FIG. 19 is connected to the changer circuit of FIG. 13 to accommodate common positive conditions, common terminal A will be connected to circuit 202 in which case the transistors 222 and 223 will utilize their transistor function in alternately and severally passing current in emitter-collector direction while circuit 201 becomes the rectifying circuit and transistors 214 and 215 operate as diodes, that is, will pass current alternately and severally in collector-emitter direction. Thus in this case again, because of the connection of intermediate terminal B to the voltage source there is provided a voltage multiplying action (voltage doubling in the present instance) with common positive connections as is the case in the circuit of FIG. 10. The operation of this circuit is that of FIG. 10 previously described.

Considering now the changer circuit of FIG. 13 as a fractionalizer it will be seen that when the external network presenting common negative connections is encountered, the circuit of FIG. 16 is connected thereto and the common negative terminal C will be connected to the dual acting circuit 201. Thus the latter, under the principles of my invention stated above becomes the rectifying circuit and transistors 214 and 215 function as diodes as previously described. Under these circumstances it will be seen that the circuit of FIG. 13 now acts as a voltage halver as described in FIG. 4.

If the circuit of FIG. 17 is connected to the voltage changer circuit of FIG. 13 to satisfy common positive conditions it will be seen that in this case the common positive terminal A will be connected to the circuit 202 whereby the latter becomes the rectifying or diode circuit while the single poled terminal C is connected to circuit 201 thereby calling upon it to operate as the switching circuit as previously described in FIG. 1.

From the foregoing, then, it will be seen that the changer circuit of FIG. 13, due to the dual action of combined switching and rectifying circuits 201 and 202 will readily receive either common negative or common positive connections and, depending upon whether the terminal B is source or load connected will provide either fractionalizing or multiplying activity, respectively. Thus the circuit of FIG. 13 is available to perform the functions of the modifier circuits of FIGS. 1, 4, 7 and 10.

Another advantage of the modifier circuit of FIGS. 13, 14 and 15 and the dual acting circuits therein when used as a fractionalizer is the accommodation of a reversal of current flow under low load or no load conditions. As the load decreases, current flow in the normal direction through the then diode acting transistor is overcome and current flows from the then inducing coil section of the inductor through that transistor in emitter-collector direction, thus maintaining the circuit complete and operative.

Additionally, the circuits of FIGS. 13, 14 and 15 are designed to permit the return of energy from the load to the source by virtue of the reversibility of activity of the transistors in those circuits. Such a condition would be that of a load having stored energy which must be returned to the source under some operating condition. The momentary function of a motor as a generator returning energy from its associated mechanical connections would be an example of such a condition.

Figure 20:
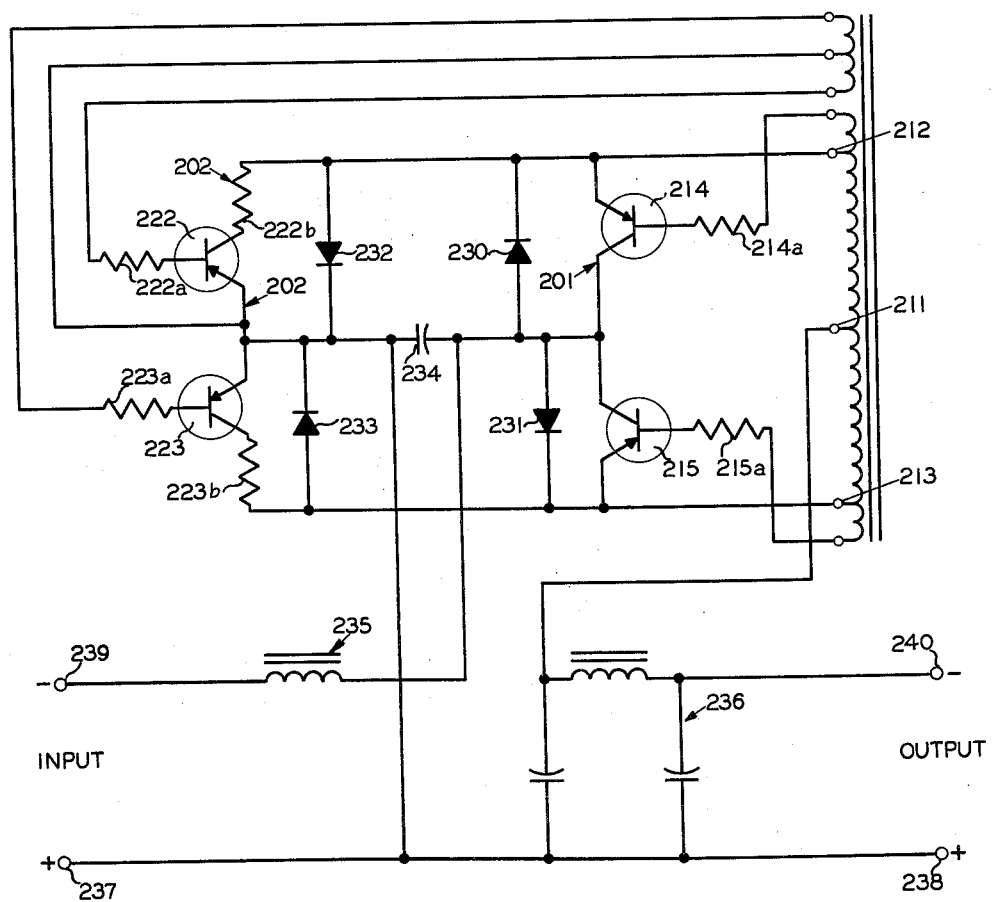
FIG. 20 is a schematic diagram of a circuit similar to that in FIG. 13 and shows filter means and resistances which may be adapted to a circuit of my invention.

The circuit of FIG. 20 is of the type shown in FIG. 13 together with the source-load network of FIG. 17, under which circumstances my device operates as a voltage halver with common positive source-load network connections. Thus transistors 214 and 215 act in their normal manner and transistors 222 and 223 serve with diode action as previously described.

This circuit has incorporated into it base resistances for each of the transistors, shown at 214a, 215a, 222a and 223a respectively, a capacitor input filter 236 together with an input choke 235 all of which represent standard practice in the art.

Additionally there are provided by-pass diodes 230, 231, 232 and 233 respectively together with capacitor 234.

Assuming that the upper half of the working coil as shown in FIG. 20 is acting as the exciting coil section and the lower half as the inducing coil section, due to feedback coil polarities in the half cycle of oscillation being described, transistor 214 and diode acting transistor 223 are in conducting condition while transistors 215 and 222 are in cut-off condition. Under these circumstances, current flows from tap 212, through transistor 214 in emitter-collector direction and to the negative terminal of the input. At the same time, current flows from coil tap 213, through diode acting transistor 223 to the positive side of the source-load network as shown. Diode 233, however, being present and poled similarly to the collector-emitter direction of transistor 223 will pass a major portion of the current due to its low resistance relative to that of transistor 223 and resistor 223b with the result that, because of this current dividing action, smaller transistors may be incorporated into the rectifying circuit 202 and yet be present to handle the reversal of flow of current under no load conditions as previously described.

It will be understood that diode 232 serves the same function with respect to diode acting transistor 222 during the next half cycle of oscillation.

Diodes 230, 231, 232 and 233 also serve as a protective measure against peak voltages which might develop in the circuit at the end of each half cycle. Assuming that the device is operating in the succeeding half cycle of oscillation from that described above, under which circumstances transistors 214 and 223 are in non-conducting condition, energy stored in the coil and discharged as voltage peaks at the instant of switching, if impressed on non-conducting transistors will be detrimental to those devices.

Accordingly, assuming that transistor 214, having been rendered non-conducting, is subjected to such a voltage peak, I have provided a diverting path for this energy.

Diodes 231 and 232 respectively, will pass current when transistors 214 and 223 are non-conducting and the current is directed through capacitor 234, the capacitance of which is large enough so that its voltage is not appreciably raised when this current is applied thereto.

It will be understood that diodes 230 and 233 function as described above at the instant of switching from the succeeding half cycle of oscillation.

Thus it will be seen that with the components described above, the voltage across the coil at terminals 212 and 213 can not exceed the voltage across terminals A and C.

From FIG. 20 it will be seen that the principles of my invention may be utilized fully with the insertion, in the circuit, of ancillary devices such as filters and chokes on the changer side of the terminal system.

To compare the terminal system of FIG. 13 to that of FIG. 20, it will be seen that the terminals 237 and 238 are the equivalent of the common terminal A of FIG. 13 when associated with the network of FIG. 17, the terminal 239 is the equivalent of the terminal C of FIG. 13 and terminal 240 is the equivalent of terminal B of FIG. 13.

It will be understood that the choke, filter, bypass diodes and capacitor described above, or equivalent thereof, may be adapted to any of the circuits shown herein.

Before considering the circuits shown in FIGS. 14 and 15 certain concepts concerning my invention as exemplified in FIGS. 1 to 13, and 20 are here considered.

From an analysis of my invention as shown in FIGS. 1 to 13 it will be seen that to attain voltage multiplying action, the following relationships exist between the components of the circuit: The source is connected across the exciting coil only; the load is connected across the exciting coil and the inducing coil; the rectifying circuit is connected to the single poled terminal of the terminal system and the intermediate terminal of the terminal system is connected to the source.

On the other hand, to attain voltage fractionalizing action the relationship between the various components of the circuits is as follows: The load is connected across the inducing coil only; the source is connected across the exciting and inducing coil sections; the rectifying circuit is connected to the common terminal and the intermediate terminal of the terminal system is connected to the load.

In other words, under all conditions the source is connected through the switching circuit to the exciting coil while the load is always connected, through the rectifying circuit, to the inducing coil.

In both of the above cases, it will be noted that the intermediate terminal is connected to the load or source depending which has the lower voltage.

With these relationships or the electrical equivalents thereof it will be seen that the wide variety of voltage modifications heretofore described, may be obtained.

Additionally, it is desirable here to consider certain relationships between the components of the adjustable modifier circuits of FIGS. 2, 3, 5, 6, 8, 9, 11 and 12.

An anlysis of the circuits in those figures will reveal:

(a) If the intermediate terminal is connected to the load and the common terminal is connected to the fixed lateral taps, then the circuit connecting the common terminal to the fixed lateral taps functions as a rectifying circuit and fractionalizing from one half source voltage to voltage equal to source voltage is obtained.

(b) If the intermediate terminal is connected to the load and the common terminal is connected to the adjustable lateral taps, then the circuit connecting the common terminal to the adjustable lateral taps will function as the rectifying circuit and zero to one half source voltage fractionalizing is obtained.

(c) If the intermediate terminal is connected to the source and the common terminal is connected to the fixed lateral taps, then the circuit connecting the common terminal to the fixed lateral taps will function as the switching circuit and equal voltage to twice source voltage multiplication is obtained.

(d) If the intermediate terminal is connected to the source and the common terminal is connected to the adjustable lateral taps, then the circuit connecting the common terminal to the adjustable lateral taps will function as the switching circuit and twice source voltage to a very high multiplication of source voltage is obtained.

To satisfy a common negative source-load connection and to obtain the conditions stated in (a) above it will be seen that the source-load network of FIG. 16 can be utilized with the voltage modifying circuit of FIG. 14. Under these conditions the circuit will operate in a manner described for the voltage modifier of FIG. 6, circuit 201 serving as the rectifying circuit and 202 as the switching circuit. On the other hand if common positive conditions are encountered and the conditions stated in (a) above are desired it will be seen that the use of the modifier circuit of FIG. 15 with the source-load network of FIG. 17 will satisfy these conditions. Under these circumstances the circuit will function in a manner of that shown in FIG. 3, circuit 202 serving as the rectifying circuit and circuit 201 as the switching circuit.

If common negative conditions are encountered and the conditions of (b) above are required it will be seen that the use of the source-load network of FIG. 16 and the modifier circuit of FIG. 15 can be utilized. Under these circumstances the arrangement functions the same as the modifier of FIG. 5, circuit 201 acting as the rectifying circuit and 202 as the switching circuit. If however, common positive conditions are encountered then the conditions of (b) above may be obtained by the utilization of the modifier network of FIG. 14 and the source-load network of FIG. 17. In this event the arrangement will function in a manner similar to FIG. 2, circuit 202 serving as the rectifying circuit and 201 as the switching circuit.

In event that the conditions of (c) above are required and common negative field conditions are encountered then the modifier circuit of FIG. 14 and the network of FIG. 18 may be combined to obtain the results similar to those described for FIG. 8, 201 serving as the switching circuit and 202 as the rectifying circuit. Should the conditions of (c) above be required and common positive field conditions encountered then the voltage modifier circuit of FIG. 15 may be connected to the source-load network shown in FIG. 19 under which circumstances the arrangement will function in the manner of FIG. 11, circuit 202 serving as the switching circuit and 201 as the rectifying circuit.

If the conditions described in (d) above are desired and common negative field connections are encountered the modifier circuit of FIG. 15 is coupled with the source-load network shown in FIG. 18 under which circumstances the arrangement will function as the modifier of FIG. 9, circuit 201 serving as the switching circuit and 202 as the rectifying circuit. In event that the conditions of (d) above are required, and common positive field connections are encountered the voltage modifier circuit of FIG. 14 is used in conjunction with the source-load network of FIG. 19. In this case the arrangement will function in the manner of FIG. 12, circuit 202 serving as the switching circuit and 201 as the rectifying circuit.

From the foregoing it will be seen that the voltage modifier circuits of FIGS. 13, 14 and 15 may be utilized to satisfy all of the conditions accommodated by the circuits of FIGS. 1 to 12, this being brought about by the utilization of switching and rectifying circuits which are functionally interchangeable.

Figure 21:
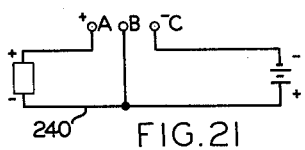
FIGS. 21 and 22 are schematic diagrams of a source-load network for polarity changing adapted for use with the modifier circuits of my invention.
Figure 22:
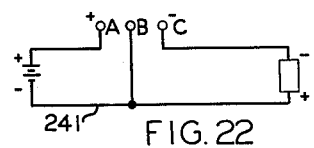

In FIGS. 21 and 22 there are shown source-load networks representing conditions encountered to which my voltage modifier is to be applied for polarity changing action.

FIG. 21 shows a load-negative to source-positive connection 240 while FIG. 22 represents a source-negative to load-positive connection 241.

Considering first FIG. 21, the voltage modifier circuit of FIG. 1 is applied thereto with respective terminals A, B and C of each circuit being connected.

Under these circumstances it will be seen that the intermediate terminal B of the changer is connected to the common lead 240 between the negative pole of the load and the positive pole of the source and to the intermediate tap 129 of the inductor coil. The load is connected through terminal A to the rectifier circuit 122 and thus to the inducing coil and the voltage source is connected to the switching circuit 121 through the negative terminal C to the exciting coil.

Assuming the polarities on the inductor coil and the feed-back coils to be those shown in FIG. 1 it will then be seen that transistor 136 has been rendered conducting and transistor 132 is cut-off.

Under these conditions current will flow from the positive pole of the voltage source through intermediate terminal B into the inductor coil at intermediate tap 129. Current from the coil flows through the lateral tap 131 and transistor 136, through terminal C back to the voltage source, thus establishing coil section 128 as the exicting coil section.

Through inductive activity of the inductor 120 current will flow from the coil through lateral tap 130, diode 140 and terminal A to the load from which it passes through terminal B.

Therefore, it will be seen that in the half cycle of oscillation being described and in accordance with the principles stated heretofore, coil section 128 is established as the exciting coil and coil section 127 is established as the inducing coil. Assuming the tap 129 to be a midtap on the working coil of the inductor it will be seen that source voltage in a ratio of one to one is accurately established by the inductor and thus source voltage is accurately applied across the load.

If a source-load network such as that shown in FIG. 22 is encountered the voltage modifier circuit of FIG. 4 may be applied.

With such an arrangement the common connector 241 between the source and the load is connected, through intermediate terminal B to the intermediate coil tap 151. The source is connected through terminal A and switching circuit 164 to the inductor coil and the load is connected through terminal C and the rectifying circuit 153 to the inductor coil.

With this arrangement, assuming transistor 165 to be rendered conducting, the polarities shown in FIG. 4, of course, then being reversed current passes from the source through terminal A and through transistor 165 to the coil through lateral tap 160. Current then flows out of the tap 151 through terminal B and back to the voltage source, thus establishing the coil section 158 as the exciting coil section. Concurrently, current flows from the load through diode 163 into tap 161 to the inductor coil and out of intermediate tap 151 through terminal B back to the load, thus establishing the coil section 159 as the inducing coil.

Again, assuming the intermediate tap 151 to be a midtap of the inductor coil it will be seen that by induction, a one to one voltage ratio between source and load has been established and thus source voltage is accurately applied across the load.

In view of the foregoing it will be seen that the desired polarity changing activity has been obtained between the voltage source and the load by means of my voltage modifier.

In accordance with the principles previously stated with regard to the voltage modifier circuit of FIG. 13, having dual acting switching-rectifying circuits, it will be seen that the modifier circuit of FIG. 13 can be applied to the network of FIGS. 21 or 22 because of the interchangeability of the switching and rectifying function of circuits 201 and 202. Again, therefore, the circuit of FIG. 13 is available for different source-load networks encountered.

From the foregoing it will be seen that in the use of my voltage modifier as a polarity changer, in all forms shown, the intermediate terminal is connected to the common lead between the load and the source, the load is connected, through one of the poled terminals to the rectifier circuit and the source is connected, through the other poled terminal to the switching circuit. Additionally, it will be seen also that, that the inductor coil section between one of the lateral taps and intermediate tap and which is across the source, is established as the exciting coil and the other coil section which is across the load is established as the inducing coil section.

From the foregoing, it may readily be determined then, which of the dual acting circuits 201 or 202 in FIG. 13 will perform the switching activity and which will perform the rectifying activity when one or the other networks of FIGS. 21 or 22 is connected thereto.

It will also be understood that, in accordance with the principles stated above with respect to the adjustable circuits previously described, polarity changing together with voltage fractionalizing or multiplying activity can be obtained by the utilization, with circuits of FIGS. 21 or 22, of the circuits shown in FIGS. 2, 3, 5, 6, 8, 9, 11, 12, 14 or 15.

Figure 23:
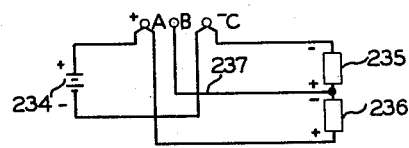
FIG. 23 is a schematic diagram of a source-load network of a three wire distribution system adapted for use with the changer circuits of my invention.

Referring to FIG. 23 there is shown a source-load network of a three wire distribution system including poled terminals A and C, intermediate terminal B, a voltage source 234 and a load including components 235 and 236.

As will be seen, the intermediate terminal B is connected between the loads by the neutral line 237. The positive poled terminal A is connected to the positive pole of the voltage source 234 and to the positive pole of the load 236 while the negative, poled terminal C is connected to the negative pole of the voltage source 234 and the negative pole of the load 235.

To the end that my voltage modifier is connected between the voltage source and the load to afford a connection for the two poled source with the three poled load system the circuits of FIGS. 1, 4 or 13 may be connected thereto by appropriate terminals under conditions to be described presently.

The voltage modifier circuits of FIGS. 1 or 4 are used with the network of FIG. 23 depending on whether the load 235 or the load 236 is the smaller.

Assuming first, that the load 235 is the smaller, then the voltage modifier circuit of FIG. 1 has its terminals connected to the respective terminals of the source-load network.

Under these conditions, assuming transistor 136 to be conducting, current will flow from the inductor coil through lateral taps 130 and 131 and into the inductor coil through intermediate tap 129. Current flowing from lateral tap 130 flows through the diode 140 to terminal A where it is joined by source current and then flows to the positive pole of load 236. From the previous explanation of my invention it will be seen that since the conducting transistor 136 is connected to coil section 128 the latter is established as the exciting coil section while coil section 127, being connected to the diode 140, is established as the inducing coil section. Thus the larger load is connected across the inducing coil and the smaller load 235 is connected across the exciting coil.

Current from the inducing coil and the source is applied to the larger load 236 to satisfy its requirement. This current, passing from the larger load 236 supplies that required by the smaller load 235, the difference in the loads resulting in the difference of current flowing from the junction of the loads through terminal B into the inductor coil through intermediate tap 129.

Current flowing from the lateral tap 131 passes through the conducting transistor 136 to terminal C where it is joined by the smaller load current flowing from the negative terminal thereof and thence passes to the negative pole of the source.

Under the above conditions it will be seen that current from the inducing section of the coil and from the source is supplied to the larger load since the latter is connected across the then inducing coil section 127 and that the needs of the smaller load 235 are also supplied as required.

Should the load 235 be the larger and the load 236 be the smaller, then the voltage modifier circuit of FIG. 4 is connected to the network of FIG. 23.

Under these circumstances, again the larger load is connected across the inducing coil and the smaller load across the exciting coil. In this circuit, current passes from the positive pole of the voltage source 234 to terminal A where it divides, part of the current passing through the transistor 169 (assuming the latter to be then conducting) to the lateral tap 161.

Current flows from the smaller load 236 to the larger load and in doing so is joined by current flowing from the intermediate tap 151 of the coil through terminal B, this additional current representing the difference of the load currents and serving, with current from the smaller load 236 to satisfy the requirements of the larger load 235. Current flows from the negative pole of the load 235 to terminal C where it divides, part flowing to the negative terminal of the voltage source 234 and the remainder flowing through diode 162 and lateral tap 160 into the inductor coil. Thus it will be seen that again the smaller load 236 is connected across the exciting coil through terminals A and B and the larger load is connected across the inducing coil through terminals B and C.

It will be understood, of course that the foregoing descriptions represent a half cycle of oscillation of the switching circuit. On the succeeding half cycle of oscillation the respective exciting and inducing sections of the coil are functionally interchanged when the alternate portions of the switching and rectifying circuits are rendered conducting by the oscillating action produced by core saturation and the feedback windings which are connected to the bases of transistors 165 and 169, or 132 and 136.

It will be readily understood that, should the voltage modifier circuit of FIG. 13 be applied to the source-load network of FIG. 23 then, due to the dual action of the rectifying and switching circuits 201 and 202, the voltage changer will function equally well when either the load 235 or the load 236 is the larger since the voltage modifier circuit of FIG. 13 can accommodate either of the electrical conditions described immediately above.

Generally speaking, it may be said that in the use of my voltage modifier with a three wire distribution system, the intermediate terminal provides the intermediate connection for the three wire system from a two poled voltage source; the poled terminals are connected to the non-intermediate terminals of the load system, each to its respective pole of load and source; the smaller load is connected across the switching circuit and the exciting coil section while the larger load is connected across the rectifying circuit and the inducing coil section. In each case the intermediate tap on the coil and intermediate terminal B serve to pass the difference between load currents whereby smaller and larger loads are supplied with substantially equal voltage. With this arrangement it will be seen that the larger load in each case being connected across the inducing coil section, it is supplied by both that coil and the voltage source so that substantially equal voltage is applied to both loads.

From the foregoing it will be seen that the adjustable ratio, voltage modifier circuits previously described can also be applied to the network of FIG. 23 for voltage source-load ratio control utilizing the principles previously described.

An analysis of the circuits shown herein will reveal that I have provided a voltage modifier which, within its own circuitry and without the addition of ancillary circuits or mechanism will both receive and supply unidirectional voltage and will subject the voltage input to various modifications such as fractionalizing, or multiplying in a wide variety of ratio ranges, will afford polarity changing and will serve as a coupling between a two poled voltage source and a three wire distribution system. It will also be seen that the circuits I have provided are so arranged that both the unidirectional characteristic of the voltage output and the voltage modification is supplied in a controlled manner to the terminal system of my device.

For instance, for voltage fractionalizing the potential across the entire working coil of the inductor is applied to the poled terminals while the load is connected only across the intermediate terminal and one of the poled terminals.

On the other hand for voltage multiplication, the load is connected across the poled terminals while the source is connected across the intermediate terminal and one of the poled terminals. Consequently the relationship of the terminal system to the various sections of the inductor coil through the switching and rectifying circuits provides the desired predetermination of the potentials between respective terminals whereby the desired change in unidirectional voltage is applied to the load.

It will be understood that the embodiments shown herein are for explanatory purposes and may be changed or modified without departing from the spirit and scope of my invention as set forth in the claims appended hereto.

What I claim is:

1. An oscillating network having in combination, an inductor including a coil with an intermediate tap dividing said coil into a plurality of windings alternately and severally available as exciting and inducing coil sections, means for rendering said coil sections interchangeably exciting and inducing with respect to said intermediate tap including a control circuit having oppositely poled, series connected electrically unidirectional devices oscillatingly defining separate electrical paths through said control circuit, a switching circuit having series connected electro-responsive devices oscillatingly defining separate electrical paths through said switching circuit, means connecting a source of voltage and a load to said oscillating network, oscillating means connected to said switching circuit and alternately and severally rendering said electro-responsive devices conducting and non-conducting; means electrically connecting the voltage source, the one of said separate paths in said switching circuit including the then conducting electro-responsive device and one of said windings to establish said winding as the exciting coil section; means concurrently connecting the load, one of the separate paths through said control circuit and the other winding to establish said other winding as the inducing coil section, the other separate paths in said control and switching circuits being rendered conducting alternately and severally with respect to said previously conducting separate paths during a succeeding one half cycle of said oscillating means.

2. In an oscillator network, a terminal system including an electrically intermediate terminal and poled terminals adapted for connection to a source of voltage and a load, an inductor having a coil provided with an intermediate tap and lateral taps, said coil including exciting and inducing windings defined by said taps, means for oscillatingly reversing said exciting and inducing functions of said windings with respect to said intermediate tap including a control circuit having semi-conductor devices connected in series and dividing said control circuit into separate electrical paths, a switching circuit having semiconductor devices connected in series and dividing said switching circuit into separate electrical paths, said control and switching circuits being connected across lateral taps in said coil, means electrically connecting said switching circuit at a point between the semi-conductor devices therein to one of said poled terminals, means electrically connecting said control circuit at a point between the semiconductor devices therein to the other of said poled terminals, means electrically connecting said intermediate terminal to said intermediate tap, oscillating means for alternately and severally rendering said semi-conductor devices in said switching circuit in conducting and non-conducting condition, one of said paths through one of said semi-conductor devices in said switching circuit and one of said devices in said control circuit being rendered conductive upon a first one half cycle of oscillation of said oscillating means and the other path through the other of said semi-conductors in said switching circuit and the other one of said devices in said control circuit being rendered conductive upon the succeeding one half cycle of oscillation of said oscillating means to apply current of like direction to said terminal system upon successive half cycle of oscillation.

3. In a voltage modifier adapted for electrical connection between a source of unidirectional voltage and a load requiring unidirectional, modified voltage, in combination, an inductor having a coil provided with an intermediate tap and lateral taps arranged to define symmetrical exciting and symmetrical inducing coil sections, a control circuit including oppositely poled, electrically unidirectional devices connected in series, said control circuit being connected across lateral taps on said coil, a switching circuit including electro-responsive, alternately and severally conducting and non-conducting devices connected in series, said switching circuit being connected across lateral taps on said coil, oscillating means for alternately and severally rendering said electro-responsive devices conducting and non-conducting, a terminal system for connecting said voltage modifier to a source and a load including oppositely poled terminals and an electrically intermediate terminal, means for electrically connecting said intermediate terminal to said intermediate tap, means for connecting one of said poled terminals to said control circuit at a point between said electrically unidirectional devices, means for connecting the other of said poled terminals to said switching circuit at a point between said electro-responsive devices, means for connecting the voltage source to the then exciting coil section through an electro-responsive device and through said terminal system and means for connecting the load to the then inducing coil section through an electrically unidirectional device and through said terminal system.

4. In a voltage modifier for electrically connecting a source of unidirectional voltage to a load and for supplying modified unidirectional voltage to the load, in combination, an inductor including a coil having alternately and severally interchangeable exciting and inducing coil sections, a switching circuit including electro-responsive switching means defining separate electrical paths through said switching circuit, a rectifying circuit including electrically unidirectional means defining separate electrical paths through said rectifying circuit, oscillating means for alternately and severally rendering said electro-responsive means conducting and non-conducting to alternately and severally energize the separate electrical paths in each of said circuits during alternate half cycles of oscillation, means for connecting the then exciting coil section through the then energized separate path in said switching circuit to the source and means for connecting the then inducing coil section through the then energized separate path in said rectifying circuit to the load.

5. In a voltage modifier for connection to a source-load network including a source of unidirectional voltage and a load and for supplying modified unidirectional voltage to the load, an inductor including a coil having an intermediate tap and lateral taps, means for connecting said intermediate tap to the network, a switching circuit including electro-responsive means defining separate electrical paths in said circuit and connected across lateral taps, means for connecting the network to said switching circuit at a point between said electro-responsive means, a rectifying circuit including electrically unidirectional means defining separate electrical paths in said rectifying circuit and connected across lateral taps, means for connecting the network to said rectifying circuit at a point between said unidirectional means, oscillating means for alternately and severally rendering said electro-responsive means in conducting and non-conducting condition to concurrently energize one of the separate paths in each of said switching and rectifying circuits during one half cycle of oscillation and the other of said separate paths in each of said circuits during the succeeding half cycle of oscillation.

6. In a voltage modifier for a source-load network having a poled unidirectional voltage source element and a poled load element and adapted to supply modified, unidirectional voltage to the load, an inductor including a coil having an intermediate tap and lateral taps defining alternately and severally exciting and alternately and severally inducing coil sections, a switching circuit including electro-responsive means defining separate electrical paths therein, a rectifying circuit including electrically unidirectional means defining separate electrical paths therein, means for connecting said switching and rectifying circuits across lateral taps, oscillating means for said switching circuit to alternately and severally render conducting one of said separate electrical paths in said switching circuit together with one of said separate paths in said rectifying circuit through one half cycle of oscillation and to render conducting the other separate paths in said circuits during the succeeding half cycle of operation, means for connecting the then conducting path in said switching circuit with the then exciting coil section and the voltage source, means for connecting the then conducting path in said rectifying circuit with the then inducing coil section and the load and means for connecting said intermediate tap on the coil to the element in the network having the lower voltage.

7. A voltage modifier adapted to be energized by a unidirectional voltage source element, and to supply modified unidirectional voltage to a load element comprising in combination, an inductor including a coil having lateral taps and an intermediate tap, switching means and rectifying means connected across lateral taps, and alternately connecting the one of said elements having the higher voltage in reverse polarity across lateral taps, said lateral taps being symmetrically disposed with respect to said intermediate tap whereby the potential between a pole of said source element and said intermediate tap is the same for both polarities of connection between said source element and said coil, the one of said source and load elements having the lower potential being connected between said intermediate tap and a pole of the other of said elements.

8. In a voltage fractionalizer for electrically connecting a source of unidirectional voltage with a load, an inductor having a coil provided with lateral taps, a switching circuit connected to said lateral taps, alternately and severally energizable electro-responsive current passing devices in series in such switching circuit, a control circuit connected to said lateral taps, oppositely poled, electrically unidirectional devices in series in said control circuit, means connecting like poles of an associated source and load between said unidirectional devices, means connecting the other pole of the load to the inductor coil between said lateral taps, means connecting the other pole of said source between said electro-responsive devices and oscillating means for said electro-responsive devices to alternately and severally render them conducting and non-conducting.

9. In a voltage fractionalizer a poled source of unidirectional voltage, a poled load, a voltage fractionalizer circuit, a terminal system for said circuit including poled terminals and an electrically intermediate terminal, one of said poled terminals being common to like poles of said source and said load, the other of said poled terminals being connected to the source pole of opposite polarity to said common terminal, said intermediate terminal being connected to the load at the pole opposite in polarity to said common terminal, said fractionalizer circuit including an inductor having a coil provided with an intermediate tap and lateral taps on either side thereof, means electrically connecting said intermediate tap to said intermediate terminal, a control circuit connecting lateral taps and including oppositely poled, series connected, electrically unidirectional devices, means connecting said control circuit at a point between said electrically unidirectional devices to said common terminal, a switching circuit connecting lateral taps, said switching circuit including series connected electro-responsive switching devices, means connecting said circuit at a point between said electro-responsive devices to said terminal poled opposite to the common terminal and oscillating means connected to said electro-responsive switching devices to render them alternately and severally in an off and on condition to thereby excite alternate sections of the coil as defined alternately by said intermediate tap and the lateral coil tap then connected to the switching circuit.

10. In a voltage fractionalizer for receiving and supplying unidirectional voltage, an external circuit including a source of unidirectional voltage and a load, an electrical circuit including an inductor coil having intermediate and lateral taps thereon, a terminal system including oppositely poled terminals and an electrically intermediate terminal, said terminal system receiving poled connections from said load and said source, one of said poled terminals being common to like poles of said source and said load, the other poled terminal being connected to the source pole opposite that of the common terminal, said intermediate terminal being connected to the remaining pole of said load, means for electrically connecting the intermediate tap on said coil to the intermediate terminal, electro-responsive, alternately and severally conducting and non-conducting devices connected in series, in oppositely poled relationship and between lateral taps, electrically unidirectional devices connected in series, in oppositely poled relationship and between lateral taps, the unidirectional device and the electro-responsive device connected to each respective side of the lateral tap being disposed in similarly poled relationship with respect to one another, means electrically connecting said common terminal between said unidirectional devices, means connecting said other poled terminal between said electro-responsive devices, means connecting said intermediate terminal and said intermediate tap, means connected to said electro-responsive devices for alternately and severally rendering the same in conducting and non-conducting condition to respectively block and afford flow of current therethrough and through alternate unidirectional devices to alternately excite different sections of said coil for supplying unidirectional, quantitatively modified voltage to said load.

11. In a voltage fractionalizer for electrically connecting a source of unidirectional voltage and a load and supplying fractionalized, unidirectional voltage to the load, in combination, an inductor including a coil having lateral taps and an intermediate tap thereon, a switching circuit, a rectifying circuit, a terminal system including an intermediate terminal connected to said intermediate tap, a first, poled terminal connected to said switching circuit and a second poled terminal connected to said rectifying circuit, means for connecting said switching and rectifying circuits across said lateral taps, oscillating means for said switching circuit, said second, poled terminal having a common positive connection with said source and load, means for connecting said first poled terminal with the negative pole of the source and means for connecting said intermediate terminal to the negative pole of said load.

12. In a voltage fractionalizer for electrically connecting a source of unidirectional voltage to a load and supplying fractionalized, unidirectional voltage to the load, in combination, an inductor including a coil having lateral taps and an intermediate tap thereon, a switching circuit, a rectifier circuit, a terminal system including an intermediate terminal connected to said intermediate tap, a first, poled terminal connected to said switching circuit and a second, poled terminal connected to said rectifying circuit, means for connecting said switching and rectifying circuits across said lateral taps, and oscillating means for said switching circuit, said second poled terminal having a common negative connection with said source and load, means for connecting said first poled terminal with the positive pole of the source and means for connecting said intermediate terminal to the positive pole of said load.

13. In a voltage fractionalizer for electrically connecting a source of unidirectional voltage to a load and supplying to the load, unidirectional voltage in ratios from zero voltage to one half of source voltage, in combination, an inductor arrangement including coil means having an intermediate tap and a tap set including fixed and adjustable taps disposed on each side of said intermediate tap, a switching circuit, a rectifying circuit, means for connecting said switching circuit across fixed taps on each side of said intermediate tap, means for connecting said rectifying circuit across adjustable taps on each side of said intermediate tap, a terminal system including an electrically intermediate terminal connected to said intermediate coil tap, a first poled terminal connected to the rectifying circuit, a second poled terminal connected to the switching circuit, means for connecting said first poled terminal to like poles of a voltage source and a load, means for connecting the intermediate terminal to the other pole of the load, means for connecting the second poled terminal to the other pole of the source and oscillating means for said switching circuit.

14. In a voltage fractionalizer for electrically connecting a source of unidirectional voltage to a load and supplying to the load, unidirectional voltage in ratios from one half source voltage to a voltage equal thereto, in combination, an inductor arrangement including coil means having an intermediate tap and a tap set including fixed and adjustable taps disposed on each side of said intermediate tap, a switching circuit, a rectifying circuit, means for connecting said switching circuit across adjustable taps on each side of said intermediate tap, means for connecting said rectifying circuit across fixed taps on each side of said intermediate tap, a terminal system including an electrically intermediate terminal connected to said intermediate coil tap, a first poled terminal connected to the rectifying circuit, a second poled terminal connected to the switching circuit, means for connecting said first poled terminal to like poles of a voltage source and a load, means for connecting the intermediate terminal to the other pole of the load, means for connecting the second poled terminal to the other pole of the source and oscillating means for said switching circuit.

15. In a voltage multiplier for electrically connecting a source of unidirectional voltage with a load, an inductor having a coil provided with lateral taps and an intermediate tap, a switching circuit connected to said lateral taps, alternately and severally energizable electro-responsive current passing devices in series in said switching circuit, a control circuit connected to said lateral taps, oppositely poled, electrically unidirectional devices in series in said control circuit, means connecting like poles of an associated source and load between said electro-responsive devices, means connecting the other pole of the source to said intermediate tap, means connecting the other pole of the load between said unidirectional devices and oscillating means for said electro-responsive devices to alternately and severally render them conducting and non-conducting.

16. In a voltage multiplier, a poled source of unidirectional voltage, a poled load, a voltage multiplier circuit, a terminal system for said circuit including poled terminals and an electrically intermediate terminal, one of said poled terminals being common to like poles of the source and the load, the single of said poled terminals being connected to the load pole of opposite polarity to the said common terminal, said intermediate terminal being connected to the source at the pole opposite in polarity to said common terminal, said multiplier circuit including an inductor having a coil provided with an intermediate tap and lateral taps on either side thereof, means electrically connecting said intermediate tap to said intermediate terminal, a control circuit connecting lateral taps and including oppositely poled, series connected electrically unidirectional devices, means connecting said control circuit at a point between said electrically unidirectional devices to the single poled terminal, a switching circuit connecting lateral taps, said switching circuit including series connected electro-responsive switching devices, means connecting said switching circuit at a point between said electro-responsive devices to said common terminal and oscillating means connected to said electro-responsive switching devices to render them alternately and severally in an off and on condition to thereby excite alternate sections of the coil as defined alternately by said intermediate and the lateral coil taps then connected to the switching circuit.

17. In a voltage multiplier for receiving and supplying unidirectional voltage, an external circuit including a source of unidirectional voltage and a load, an electrical circuit including an inductor coil, intermediate and lateral taps thereon, a terminal system including oppositely poled terminals and an electrically intermediate terminal, said terminal system receiving poled connections from said load and said source, one of said poled terminals being common to like poles of said source and said load, the other poled terminal being connected to the load pole opposite that of the common terminal, said intermediate terminal being connected to the remaining pole of said source, means for electrically connecting the intermediate tap on said coil to the intermediate terminal, electro-responsive, alternately and severally conducting and non-conducting devices connected in series, in oppositely poled relationship and between lateral taps, electrically unidirectional devices connected in series, in oppositely poled relationship and between lateral taps, the unidirectional device and the electro-responsive device connected to each respective side of the lateral tap being disposed in similarly poled relationship with respect to one another, means electrically connecting said common terminal between electro-responsive devices, means connecting said other poled terminal between said unidirectional devices, means connecting said intermediate terminal and said intermediate tap, means connected to said electro-responsive devices for alternately and severally rendering the same in conducting and non-conducting condition to respectively block and afford flow of current therethrough and through alternate unidirectional devices to alternately excite different sections of said coil for supplying unidirectional, quantitatively modified voltage to said load.

18. In a voltage multiplier for electrically connecting a source of unidirectional voltage to a load and supplying a unidirectional multiple of source voltage to the load, in combination, an inductor including a coil having lateral taps and an intermediate tap thereon, a switching circuit, a rectifying circuit, a terminal system including an intermediate terminal connected to said intermediate tap, a first poled terminal connected to said switching circuit and a second poled terminal connected to said rectifying circuit, means for connecting said switching and rectifying circuits across said lateral taps and oscillating means for said switching circuit, said first poled terminal having a common negative connection with the source and the load, means for connecting said second poled terminal with the positive pole of the load and means for connecting said intermediate terminal to the positive pole of said source.

19. In a voltage multiplier for electrically connecting a source of unidirectional voltage to a load and supplying a unidirectional multiple of source voltage to the load, in combination, an inductor including a coil having lateral taps and an intermediate tap thereon, a switching circuit, a rectifying circuit, a terminal system including an intermediate terminal connected to said intermediate tap, a first poled terminal connected to said switching circuit and a second poled terminal connected to said rectifying circuit, means for connecting said switching and rectifying circuits across said lateral taps and oscillating means for said switching circuit, said first poled terminal having a common positive connection with the source and the load, means for connecting said second poled terminal with the negative pole of the load and means for connecting said intermediate terminal to the negative pole of said source.

20. In a voltage multiplier for electrically connecting a source of unidirectional voltage to a load and supplying to the load, unidirectional voltage in ratios from source voltage to twice the source voltage, in combination, an inductor arrangement including coil means having an intermediate tap and a tap set including fixed and adjustable taps disposed on each side of said intermediate tap, a switching circuit, a rectifying circuit, means for connecting said switching circuit across adjustable taps on each side of said intermediate tap, means for connecting said rectifying circuit across fixed taps on each side of said intermediate tap, a terminal system including an electrically intermediate terminal connected to said intermediate coil tap, a first poled terminal connected to the switching circuit, a second poled terminal connected to the rectifying circuit, means for connecting said first poled terminal to like poles of a voltage source and load, means for connecting the intermediate terminal to the other pole of the source, means for connecting second poled terminal to the other pole of the load and oscillating means for said switching circuit.

21. In a voltage multiplier for electrically connecting a source of unidirectional voltage to a load and supplying to the load, unidirectional voltage in ratios from twice the source voltage to a high multiple thereof, in combination, an inductor arrangement including coil means having an intermediate tap and a tap set including fixed and adjustable taps disposed on each side of said intermediate tap, a switching circuit, a rectifying circuit, means for connecting said switching circuit across adjustable taps on each side of said intermediate tap, means for connecting said rectifying circuit across fixed taps on each side of said intermediate tap, a terminal system including an electrically intermediate terminal connected to said intermediate coil tap, a first poled terminal connected to the switching circuit, a second poled terminal connected to the rectifying circuit, means for connecting said first poled terminal to like poles of a voltage source and load, means for connecting the intermediate terminal to the other pole of the source, means for connecting the second poled terminal to the other pole of the load and oscillating means for said switching circuit.

22. In a voltage modifier for electrically connecting a source of unidirectional voltage to a load and for supplying modified unidirectional voltage to said load, in combination, an inductor including a coil having lateral taps and an intermediate tap disposed there-between, a first switching and rectifying circuit including transistors in series and collector connected, a second switching and rectifying circuit including transistors in series and emitter connected, each of said transistors including at least emitter, base and collector electrodes, a terminal system including poled terminals and an electrically intermediate terminal, means for connecting said first and second circuits across lateral taps, means for connecting said intermediate tap to said electrically intermediate terminal, means for connecting the first of said circuits at a point between the transistors therein to one of said poled terminals, means for connecting the second of said circuits at a point between the transistors therein to the other of said poled terminals and an oscillating arrangement for said circuits including means for applying, during each half cycle of oscillation, bias to the bases of the series connected transistors in each of said circuits to render one of said transistors in each circuit conducting and the other one non-conducting and for applying bias to the bases of the respective transistors in each circuit connected to respective lateral taps on the same side of said intermediate tap of said transistors to render one conducting and the other non-conducting.

23. In a voltage modifier for connecting a source of unidirectional voltage to a load and supplying to said load, unidirectional voltage in varying ratios, in combination, an inductor arrangement including coil means having an intermediate tap and a set of fixed and adjustable taps disposed on each side of said intermediate tap, a first switching and rectifying circuit including transistors in series and collector connected, a second switching and rectifying circuit including transistors in series and emitter connected, each of said transistors including at least emitter, base and collector electrodes, a terminal system including poled terminals and an electrically intermediate terminal, means for connecting said first circuit across fixed lateral taps on each side of said intermediate tap, means for connecting said second circuit across adjustable lateral taps on each side of said intermediate tap, means for connecting said intermediate tap to said intermediate terminal, means for connecting said first circuit at a point between the transistors therein to the negative of said poled terminals, means for connecting said second circuit at a point between the transistors therein to the positive of said poled terminals and an oscillating arrangement for said circuit including means for applying, during each half cycle of oscillation, bias to the bases of the series connected transistors in each of said circuits to render one of said transistors in each circuit conducting and the other non-conducting and for applying bias to the bases of the respective transistor in each circuit connected to respective lateral taps on the same side of said intermediate tap to render one of said transistors conducting and the other non-conducting.

24. In a voltage modifier for connecting a source of unidirectional voltage to a load and supplying to said load, unidirectional voltage in varying ratios, in combination, an inductor arrangement including coil means having an intermediate tap and a set of fixed and adjustable taps disposed on each side of said intermediate tap, a first switching and rectifying circuit including transistors in series and collector connected, a second switching and rectifying circuit including transistors in series and emitter connected, each of said transistors including emitter, base and collector electrodes, a terminal system including poled terminals and an electrically intermediate terminal, means for connecting said first circuit across adjustable lateral taps on each side of said intermediate tap, means for connecting said second circuit across fixed lateral taps on each side of said intermediate tap, means for connecting said intermediate tap to said intermediate terminal, means for connecting said first circuit at a point between the transistors therein through the negative of said poled terminals, means for connecting said second circuit at a point between the transistors therein to the positive of said poled terminals, and an oscillating arrangement for said circuits including means for applying, during each half cycle of oscillation, bias to the bases of series connected transistors in each of said circuits to render one of said transistors in each circuit conducting and the other non-conducting and for applying bias to the bases of the respective transistor in each circuit connected to respective lateral taps on the same side of said intermediate tap to render one of said transistors conducting and the other non-conducting.

25. In a polarity changer for a source-load network having an electrical connection between unlike poles of the voltage source and the load, in combination, an inductor including a coil having lateral taps and an intermediate tap, a switching circuit, a rectifying circuit, a terminal system including poled terminals and an electrically intermediate terminal, oscillating means for said switching circuit, means for connecting said switching and rectifying circuits across lateral taps on said coil, means for connecting said intermediate terminal to said intermediate tap, means for connecting said switching circuit through one of said poled terminals to the other pole of the source and means for connecting said rectifying circuit through the other of said poled terminals to the other pole of the load.

26. In a polarity changer for a source-load network having an electrical connection between unlike poles of the voltage source and the load, in combination, an inductor including a coil having lateral taps and an intermediate tap, a switching circuit, a rectifying circuit, oscillating means for said switching circuit, means for connecting said switching and rectifying circuits across lateral taps on the coil, means for connecting said intermediate tap to said connection between unlike poles of the source and load, means for connecting said switching circuit to the other pole of the source and means for connecting said rectifying circuit to the other pole of the load.

27. In a voltage modifier for connecting a two poled source of unidirectional voltage to a three wire distribution system, an inductor including a coil having exciting and inducing coil sections, a switching circuit including electro-responsive means defining separate electrical paths through said circuit, a rectifying circuit including electrically unidirectional means defining separate electrical paths through said circuit, a terminal system including an electrically intermediate terminal and poled terminals, oscillating means for said switching circuit adapted to alternately and severally render electro-responsive means in said switching circuit in conducting and non-conducting condition to alternately and severally energize separate paths in said switching circuit and the rectifying circuit during each half cycle of oscillation, third wire means for connecting to said coil, between said exciting and inducing coil sections, and through said intermediate terminal to a junction between loads in the three wire distribution system, means for connecting the then exciting coil section through the then energized separate paths in said switching circuit and through one of said pole terminals to the like pole of one of said loads, means for connecting the then inducing coil section through the then energized separate paths in said rectifying circuit, through the other of said poled terminals to the like pole of the other of said loads and means for connecting each of said poled terminals to like poles of the voltage source in said three wire distribution system.

28. In an oscillator network having a terminal system including poled terminals and an electrically intermediate terminal and adapted for connection to a source of voltage and a load, in combination, an inductor including a coil having lateral taps and an intermediate tap, a switching circuit, a rectifying circuit, oscillating means for said switching circuit, means for connecting said switching and rectifying circuits across lateral taps, means for connecting said intermediate tap to said electrically intermediate terminal, means for connecting said switching circuit to one of said poled terminals and means for connecting said rectifying circuit to the other of said poled terminals.

29. In an oscillator network having a terminal system including poled terminals and an electrically intermediate terminal and adapted for connection to a source of voltage and a load, in combination, an inductor including a coil having an intermediate tap and lateral taps, a switching circuit including series connected electro-responsive devices, a rectifying circuit including series connected, oppositely poled, electrically unidirectional devices, oscillating means for said switching circuit, means for connecting said switching and rectifying circuits across lateral taps on the inductor coils, means for connecting said intermediate taps to said intermediate terminal, means for connecting said switching circuit at a point between said electro-responsive devices to one of said poled terminal and means for connecting said rectifying circuit at a point between said electrically unidirectional devices to the other of said poled terminals.

30. In an oscillator network having a terminal system including poled terminals and an electrically intermediate terminal and adapted for connection to a source of voltage and a load, in combination, an inductor including a coil having an intermediate tap and lateral taps, a switching circuit including series connected, oppositely poled, electro-responsive devices, a rectifying circuit including series connected, oppositely poled, electrically unidirectional devices, oscillating means for said switching circuit, means for connecting said switching and rectifying circuits across lateral taps, on the inductor coil, said electro-responsive device and electrically unidirectional device adjacent respective lateral taps being similarly poled, means for connecting said intermediate tap to said intermediate terminal, means for connecting said switching circuit at a point between said electro-responsive devices to one of said poled terminals and means for connecting said rectifying circuit at a point between said electrically unidirectional devices to the other of said poled terminals.

31. In an oscillator network having a terminal system including poled terminals and an electrically intermediate terminal and adapted for connection to a source of unidirectional voltage and supplying a modified, unidirectional voltage to a load, in combination, an inductor including coil-means having an intermediate tap and having fixed and adjustable taps disposed on each side of coil intermediate tap, a switching circuit, a rectifying circuit, means for connecting one of coil circuits across fixed taps one on each side of said intermediate tap, means for connecting the other of said circuits across adjustable taps one on each side of said intermediate tap, means for connecting said electrically intermediate terminal to said intermediate tap, means for connecting one of said poled terminals to one of said circuits, means for connecting the other of said poled terminals to the other of said circuits and oscillating means for said switching circuit.

32. A voltage fractionalizer adapted to be energized by a source of unidirectional voltage and to supply unidirectional voltage to a load, comprising in combination, an inductor including a coil having lateral taps and an intermediate tap, circuit means for connecting said source across lateral taps, and alternately connecting said source in reverse polarity across lateral taps, said lateral taps being symmetrically disposed with respect to said intermediate tap, whereby the potential between a pole of said source and said intermediate tap is the same for both polarities of connection between said source and said coil and means for connecting said load between said intermediate tap and a pole of said source.

33. A voltage multiplier adapted to be energized by a source of unidirectional voltage and to supply unidirectional voltage to a load comprising, in combination, an inductor including a coil having lateral taps and an intermediate tap, circuit means for connecting said load across lateral taps, and alternately connecting said load in reverse polarity across lateral taps, said lateral taps being symmetrically disposed with respect to said intermediate tap, whereby the potential between a pole of said load and said intermediate tap is the same for both polarities of connection between said load and said coil and means for connecting said source between said intermediate tap and a pole of said load.

34. A voltage modifier for connecting a two-poled source of unidirectional voltage to a three wire distribution system and comprising, in combination, a coil having a mid-tap and first and second lateral taps, circuit means for connecting respective poles of said source to said first and second taps, and alternately connecting opposite poles of said two-poled source to said first and second taps, the extremities of said three wire distribution system being energized from said two-poled source and means for connecting the intermediate wire of said distribution system to said mid-tap.

References Cited in the file of this patent
UNITED STATES PATENTS

| | | |
|---|---|---|
| 2,788,493 | Zawels | Apr. 9, 1957 |
| 2,837,651 | Schultz | June 3, 1958 |
| 2,846,581 | Volkers | Aug. 5, 1958 |
| 2,852,730 | Magnuski | Sept. 16, 1958 |
| 2,890,403 | Van Abbe | June 9, 1959 |

UNITED STATES PATENT OFFICE
CERTIFICATE OF CORRECTION

Patent No. 3,015,771　　　　　　　　　　　　January 2, 1962

Lee Orland Mesenhimer

It is hereby certified that error appears in the above numbered patent requiring correction and that the said Letters Patent should read as corrected below.

Column 7, line 13, for "lead" read -- load --; column 8, line 63, for "139a" read -- 129a --; column 11, line 50, for "he" read -- the --; column 13, line 72, for "wil" read -- will --.

Signed and sealed this 8th day of May 1962.

(SEAL)
Attest:

ERNEST W. SWIDER
Attesting Officer

DAVID L. LADD
Commissioner of Patents